US011465383B2

(12) United States Patent
Yamaguchi et al.

(10) Patent No.: US 11,465,383 B2
(45) Date of Patent: *Oct. 11, 2022

(54) ELECTROPHOTOGRAPHIC MEMBER, ELECTROPHOTOGRAPHIC PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Sosuke Yamaguchi, Chiba (JP); Shohei Urushihara, Mishima (JP); Kazuaki Nagaoka, Susono (JP); Ryo Sugiyama, Mishima (JP); Minoru Nakamura, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 341 days.

This patent is subject to a terminal disclaimer.

(21) Appl. No.: 16/526,125

(22) Filed: Jul. 30, 2019

(65) Prior Publication Data
US 2020/0041921 A1 Feb. 6, 2020

(30) Foreign Application Priority Data
Jul. 31, 2018 (JP) .............................. JP2018-144377

(51) Int. Cl.
*B32B 3/08* (2006.01)
*B32B 33/00* (2006.01)

(52) U.S. Cl.
CPC .............. *B32B 3/085* (2013.01); *B32B 33/00* (2013.01); *B32B 2255/26* (2013.01);
(Continued)

(58) Field of Classification Search
CPC .............. B32B 3/085; B32B 2307/202; B32B 2307/206
(Continued)

(56) References Cited

U.S. PATENT DOCUMENTS 5,239,344 A 8/1993 Enoki
7,727,134 B2 6/2010 Nakamura et al.
(Continued)

FOREIGN PATENT DOCUMENTS

CN 101241334 A 8/2008
CN 101523304 A 9/2009
(Continued)

OTHER PUBLICATIONS

U.S. Appl. No. 16/516,790, Kazutoshi Ishida, filed Jul. 19, 2019.
(Continued)

*Primary Examiner* — Betelhem Shewareged
(74) *Attorney, Agent, or Firm* — Venable LLP

(57) ABSTRACT

Provided an electrophotographic member capable of causing less fog in an H/H environment even when used in a torque-reduced image forming apparatus. The member comprises an electro-conductive substrate, an electro-conductive layer thereon and insulating parts, the member having a surface having an electrical insulating first region and an electro-conductive second region, the first region and the second region being adjacent to each other, a total area of the second region in a square region put on an outer surface of the member is 30% to 80% of an area of the square region; two or more of the 200 straight lines drawn in the square region at an interval of 5 μm pass the second region at least once, and, the number of line segment LS having a length of 200 μm or more is 5% or less of the total number of the line segment LS.

10 Claims, 6 Drawing Sheets

(52) U.S. Cl.
CPC ... *B32B 2307/202* (2013.01); *B32B 2307/206* (2013.01); *B32B 2559/00* (2013.01)

(58) Field of Classification Search
USPC .................................................... 428/195.1
See application file for complete search history.

(56) References Cited

U.S. PATENT DOCUMENTS

| | | | |
|---|---|---|---|
| 7,797,833 | B2 | 9/2010 | Nakamura et al. |
| 7,798,948 | B2 | 9/2010 | Kawamura et al. |
| 7,799,398 | B2 | 9/2010 | Nakamura et al. |
| 8,176,632 | B2 | 5/2012 | Kawamura et al. |
| 8,529,806 | B2 | 9/2013 | Kawamura et al. |
| 8,655,222 | B2 | 2/2014 | Nakamura et al. |
| 8,655,238 | B2 | 2/2014 | Uno et al. |
| 8,768,227 | B2 | 7/2014 | Urushihara et al. |
| 8,798,508 | B2 | 8/2014 | Yamada et al. |
| 8,874,007 | B2 | 10/2014 | Kawamura et al. |
| 9,482,986 | B2 | 11/2016 | Sakurai et al. |
| 9,581,931 | B2 | 2/2017 | Yamada et al. |
| 9,625,854 | B2 | 4/2017 | Koyanagi et al. |
| 9,639,009 | B2 | 5/2017 | Yamaguchi et al. |
| 9,811,009 | B2 | 11/2017 | Yamada et al. |
| 9,846,407 | B2 | 12/2017 | Nakamura et al. |
| 9,921,518 | B2 | 3/2018 | Sakurai et al. |
| 9,952,531 | B2 | 4/2018 | Ishii et al. |
| 9,952,532 | B2 | 4/2018 | Sugiyama et al. |
| 9,964,914 | B2 | 5/2018 | Arimura et al. |
| 9,977,353 | B2 | 5/2018 | Nishioka et al. |
| 9,977,359 | B2 | 5/2018 | Koyanagi et al. |
| 10,018,934 | B2 | 7/2018 | Yamada et al. |
| 10,108,129 | B2 | 10/2018 | Yamaguchi et al. |
| 10,197,930 | B2 | 2/2019 | Yamada et al. |
| 10,310,447 | B2 | 6/2019 | Morishita et al. |
| 10,331,054 | B2 | 6/2019 | Urushihara et al. |
| 10,379,460 | B2 | 8/2019 | Arimura et al. |
| 10,571,825 | B1* | 2/2020 | Urushihara ........ G03G 15/0808 |
| 10,976,683 | B2* | 4/2021 | Ishida ................ G03G 15/0233 |
| 2008/0193171 | A1 | 8/2008 | Adachi |
| 2008/0193172 | A1 | 8/2008 | Kusaba |
| 2010/0158578 | A1 | 6/2010 | Kojima |
| 2013/0164038 | A1 | 6/2013 | Kusaba et al. |
| 2013/0243499 | A1 | 9/2013 | Ishikura |
| 2013/0266339 | A1 | 10/2013 | Sugiyama et al. |
| 2015/0055989 | A1 | 2/2015 | Goto |
| 2015/0286182 | A1 | 10/2015 | Mitsui |
| 2015/0331342 | A1 | 11/2015 | Yamaguchi et al. |
| 2015/0331346 | A1 | 11/2015 | Yamauchi et al. |
| 2016/0252842 | A1* | 9/2016 | Sakurai .............. G03G 15/0808 399/286 |
| 2016/0363881 | A1 | 12/2016 | Urushihara et al. |
| 2017/0139336 | A1 | 5/2017 | Nagaoka et al. |
| 2017/0248867 | A1 | 8/2017 | Sakurai |
| 2017/0285512 | A1 | 10/2017 | Okubo et al. |
| 2018/0217551 | A1 | 8/2018 | Arimura et al. |
| 2019/0265609 | A1 | 8/2019 | Sakurai et al. |
| 2019/0324382 | A1 | 10/2019 | Sugiyama et al. |
| 2020/0041921 | A1* | 2/2020 | Yamaguchi ............ G03G 15/75 |

FOREIGN PATENT DOCUMENTS

| | | |
|---|---|---|
| CN | 103309207 A | 9/2013 |
| CN | 105929654 A | 9/2016 |
| EP | 3 062 162 | 8/2016 |
| JP | H06-130792 A | 5/1994 |
| JP | H07-160113 | 6/1995 |
| JP | H08-286497 | 11/1996 |
| JP | H03-288873 A | 12/1999 |
| JP | 2006-259021 A | 9/2006 |
| JP | 2012-42574 A | 3/2012 |
| JP | 2015-41084 A | 3/2015 |
| JP | 2016-164654 A | 9/2016 |
| JP | 2017-15800 A | 1/2017 |
| JP | 2017-156745 A | 9/2017 |
| JP | 2017-173714 A | 9/2017 |
| JP | 2018-025767 A | 2/2018 |
| WO | 2014/081046 A1 | 5/2014 |

OTHER PUBLICATIONS

U.S. Appl. No. 16/524,794, Shohei Urushihara, filed Jul. 29, 2019.
U.S. Appl. No. 16/525,693, Seiji Tsuru, filed Jul. 30, 2019.
U.S. Appl. No. 16/540,463, Noriyuki Doi, filed Aug. 14, 2019.
U.S. Appl. No. 16/541,732, Kazuhito Wakabayashi, filed Aug. 15, 2019.
U.S. Appl. No. 16/545,434, Kenta Matsunaga, filed Aug. 20, 2019.
U.S. Appl. No. 16/569,768, Fumihiko Utsuno, filed Sep. 13, 2019.
U.S. Appl. No. 16/672,770, Wataru Moriai, filed Nov. 4, 2019.

* cited by examiner

ELECTROPHOTOGRAPHIC MEMBER, ELECTROPHOTOGRAPHIC PROCESS CARTRIDGE AND ELECTROPHOTOGRAPHIC IMAGE FORMING APPARATUS

BACKGROUND OF THE INVENTION

Field of the Invention

The present disclosure relates to an electrophotographic member and also relates to an electrophotographic process cartridge and an electrophotographic image forming apparatus.

Description of the Related Art

As an image forming method of an electrophotographic image forming apparatus such as copying machine or optical printer, a developing method using a nonmagnetic monocomponent toner is known. Described specifically, a photoreceptor which is a rotatable electrostatic latent image carrier is charged by a charging unit such as charging roller and the surface of the charged photoreceptor is exposed to a laser light to form an electrostatic latent image. Then, in a developing unit of an image forming apparatus, a toner in a developer container is applied onto a developing member such as developing roller by a developer regulating member and at a contact part between the photoreceptor and the developing roller, development of the electrostatic latent image with the toner is performed. Then, the toner image on the photoreceptor is transferred to a recording material at a transfer unit directly or via an intermediate transfer member and is fixed onto the recording material at a fixing unit by heat and pressure. Then, the recording member having a fixed image is ejected from the image forming apparatus.

In such an image forming method, a developing unit has a combination of electrophotographic members as described below if necessary.

(1) A developer supply member present in a developer container and supplying a developing member with a toner.

(2) A developer regulating member for forming a toner layer on a developing member and regulating the toner on the developing member to a fixed amount.

(3) A developing member for developing the toner on a photoreceptor, which member is arranged to close the opening of the developer container for housing the toner therein and at the same time, expose a portion of the opening to the outside of the container so that the exposed portion faces the photoreceptor.

In the developing unit, an image is formed by the rotation, sliding and rubbing of these electrophotographic members.

In recent years, downsizing or energy saving is advancing in an image forming apparatus such as copying machine or optical printer. Examples of a method of downsizing an image forming apparatus include reduction in the diameter of each member such as developing member or developer supply member. Examples of a method of saving the energy of an image forming apparatus include reduction in torque at the time of rotation or sliding and rubbing of each member (reduction in entry amount of each member, reduction in difference in circumferential speed and reduction in the number of members). Reduction in diameter of a developing member or developer supply member or reduction in torque at the time of rotation by reduction in entry amount of each member or reduction in difference in circumferential speed are however accompanied with such a drawback that it causes a shortage of an amount of a toner layer formed on the developing member and prevents formation of a uniform image.

To overcome the above-described drawback, Japanese Patent Application Laid-Open No. H03-288873 discloses a toner carrier (developing member) capable of conveying a toner by providing an insulating region having a high electric resistance on the surface of an electro-conductive region, charging the insulating region and allowing the toner to electrically adsorb thereto.

Japanese Patent Application Laid-Open No. H06-130792 discloses a developing unit including a developer carrier having a surface on which both an insulating region and an electro-conductive region are distributed and a developer charging unit and capable of forming a toner layer having a desired attaching amount and charging amount on the surface of a developer carrier (developing member) and supplying it to an image carrier even if a developer supply member is omitted.

According to the study by the present inventors, when as a developer roller of an electrophotographic image forming apparatus using a constitution for reducing a drive torque of the developing roller, the developing roller having an insulating region and an electro-conductive region as described above is used, an electrophotographic image sometimes has "fog" at the time of forming an image in a high-temperature and high-humidity environment such as an environment of a temperature of 33° C. and a relative humidity of 80%.

SUMMARY OF THE INVENTION

One aspect of the present disclosure is directed to providing an electrophotographic member useful for provision of a high-quality image even when an image forming apparatus is driven at a reduced torque and at the same time, is used in a high-temperature and high-humidity environment. Another aspect of the present disclosure is directed to providing an electrophotographic process cartridge and an electrophotographic image forming apparatus useful for the stable formation of a high quality electrophotographic image.

According to the one aspect of the present disclosure, there is provided an electrophotographic member comprising an electro-conductive substrate, an electro-conductive layer on the substrate and insulating parts, wherein the electrophotographic member has a surface having an electrical insulating first region and an electro-conductive second region, the first region and the second region are adjacent to each other, assuming that a square region where each side has in 1000 μm, is put on an outer surface of the electrophotographic member so that one side of the square region is parallel to a longer direction of the electrophotographic member, a total area of the second region in the square region is 30% or more to 80% or less of an area of the square region; and assuming that 200 straight lines are drawn in the square region at an interval of 5 μm in a circumferential direction of the electrophotographic member, two or more of the 200 straight lines pass the second region at least once, and when in each of the straight lines passing the second region at least once, a portion overlapping with the second region is defined as a line segment LS, the number of the line segment LS having a length of 200 μm or more is 5% or less of the total number of the line segments LS.

According to another aspect of the present disclosure, there is provided an electrophotographic process cartridge mounted detachably on the main body of an electrophotographic image forming apparatus. The cartridge is equipped with at least a toner container containing a toner and a developing unit for supplying the toner. The developing unit has the above-described electrophotographic member.

According to a further aspect of the present disclosure, there is provided an electrophotographic image forming apparatus having an electrophotographic photoreceptor, a charging member placed to enable charging of the electrophotographic photoreceptor and a developing member for supplying a toner to the electrophotographic photoreceptor. The developing member has the above-described electrophotographic member.

Further features of the present invention will become apparent from the following description of exemplary embodiments with reference to the attached drawings.

DESCRIPTION OF THE EMBODIMENTS

[Electrophotographic Member]

In the present disclosure, the term "electrophotographic member" means a member such as developer carrier, transfer member, charging member, cleaning member or developer layer thickness regulating member. Specific examples include an electrophotographic member in a roller form (which may also be called "electrophotographic roller" hereinafter) such as developing roller, transfer roller or charging roller. The electrophotographic member according to the present disclosure will hereinafter be described, if necessary, by a developing member in a roller form (which may also be called "developing roller" hereinafter) which is a typical example of the electrophotographic member, but the present disclosure is not limited to or by it.

The electrophotographic member according to one aspect of the present disclosure has, on the outer surface thereof, an electro-conductive surface (which may also be called "second region" hereinafter) and an insulating region-surface (which may also be called "first region" hereinafter). In this electrophotographic member, the first region and the second region are adjacent to each other. In the electrophotographic member having, on the outer surface thereof, the first region and the second region, as the first region is charged, an electric field occurs between the first region and the second region to cause adsorption conveyance of the toner with Coulomb force or gradient force.

Figure 1:
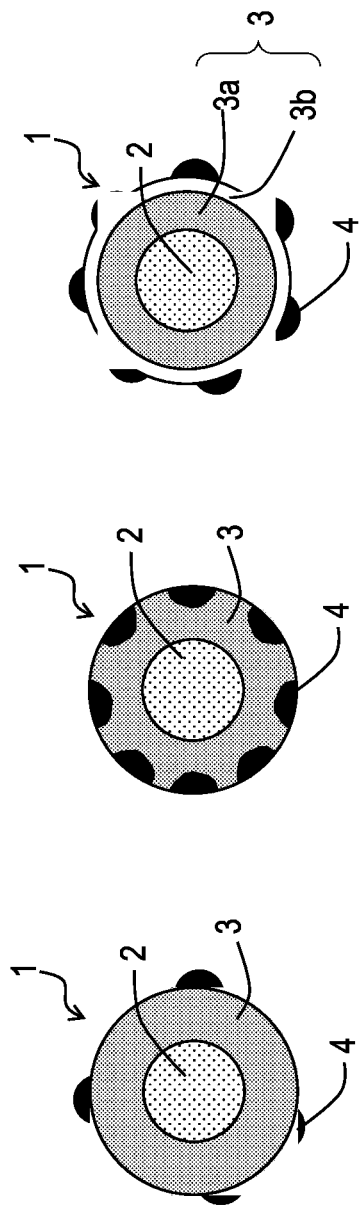
FIG. 1A is a schematic view showing one example of the electrophotographic member according to the present disclosure.
FIG. 1B is a schematic view showing another example of the electrophotographic member according to the present disclosure.
FIG. 1C is a schematic view showing a further example of the electrophotographic member according to the present disclosure.

FIGS. 1A to 1C are examples showing a cross-section of the electrophotographic roller according to the present embodiment in a direction orthogonal to the longer direction of the roller. For example, as shown in FIG. 1A, the electrophotographic member is an electrophotographic roller 1 constituted of an electro-conductive substrate 2, an electro-conductive layer 3 on the substrate and an insulating part 4 on the outer surface of the electro-conductive layer 3. As shown in FIG. 1B, it may have, in the electro-conductive layer 3 thereof, the insulating part 4 exposed from the outer surface. In FIG. 1A and FIG. 1B, a portion of the electro-conductive layer 3 (not covered with the insulating part 4) exposed from the surface is the second region and a surface of the insulating part 4 on a side opposite to a side facing the electro-conductive layer 3 is the first region.

Further, as shown in FIG. 1C, the electro-conductive layer 3 is constituted of two layers 3a and 3b. When a portion of the layer (layer 3b) of the electro-conductive layers contiguous to the insulating part 4 and exposed from a surface not covered with the insulating part 4 is the second region and a surface of the insulating part 4 on a side opposite to a side facing the layer 3b is the first region.

The results of the investigation by the present inventors have revealed that appropriate control of the arrangement of the second region of the electrophotographic member can effectively suppress fogging in an image forming apparatus intended to be driven at reduced torque. In other words, the percentage of the area of the second region (which may also be called "percent of exposure" hereinafter) in the outer surface of the electrophotographic member such as developer roller becomes an indicator in the present disclosure and at the same time, a smaller percentage of long line segment in the line segment LS contributes to suppression of fog in a high-temperature and high-humidity environment when the member is loaded in the image forming apparatus. The reason of it will hereinafter be described.

When in an electrophotographic image forming apparatus adopting a constitution intended to reduce the drive torque of a developing roller, the developing roller relating to Japanese Patent Application Laid-Open No. H03-288873 or the developing roller relating to Japanese Patent Application Laid-Open No. H06-130792 is used therefore, the electrophotographic image thus obtained may have fog. A description will next be made on this fog in order.

For reducing the torque of an electrophotographic image forming apparatus, there is a method of weakening a contact pressure of a cleaning member with a photoreceptor.

In the above-described method, however, a component of recording sheet or a toner which has remained without being transferred attaches to the photoreceptor. In the above-described image forming apparatus, a Vback (a difference in voltage between a potential VD at the background part of the photoreceptor and a potential VDC of the electrophotographic member) is sometimes set large to collect these components in the developing unit.

In this case, a relatively large electric field occurs in a toner present at the contact portion between the photoreceptor and the electrophotographic member. Then, the negative charge on the toner surface is transferred to the side of the electrophotographic member and causes shortage of an electric charge of the toner. As a result, the toner with insufficient electric charge is transferred to the background part of the photoreceptor and causes fog.

Next, described is the fog generated when in the above-described electrophotographic image forming apparatus reduced in a contact pressure between a cleaning member and a developing member, an entry amount of a toner supply roller is decreased to reduce the drive torque of the developing member further.

First, decreasing the entry amount of a toner supply roller causes a decrease in a supply amount of the toner to the electrophotographic member. As a solution of this problem, a developing roller having an insulating region and an electro-conductive region placed on the surface thereof has already been known. When both the insulating region and the electro-conductive region are present on the surface of the electrophotographic member, a gradient force occurs due to a difference in potential between the insulating region and the electro-conductive region, contributing to enhancement of toner supply power.

"Fog" on an electrophotographic image when such an electrophotographic member having, on the surface thereof, an insulating region and an electro-conductive region as described above is used is generated because the toner rolls on the electro-conductive region at the contact part between the photoreceptor and the electrophotographic member. The transfer of the charge of the toner due to Vback occurs in the electro-conductive region of the developing roller, while in the insulating region, the transfer of the charge of the toner hardly occurs. Arrangement of the electro-conductive region, particularly, arrangement of it in a circumferential direction to which the toner rolls by sliding and rubbing with another member is presumed to be important.

(Confirmation of First Region and Second Region)

Presence of the first region and the second region can be confirmed by observing presence of two or more regions on the outer surface of the developing roller by an optical microscope, scanning electron microscope or the like.

The first region has preferably a volume resistivity of $1.0 \times 10^{13}$ Ω·cm or more. The second region has preferably a volume resistivity of $1.0 \times 10^{11}$ Ω·cm or more. This volume resistivity can be measured, for example, by a method as described below.

From an electrophotographic member, a sample including a first region is cut out and the sample is sliced into a thin sample having a planar size 50 μm in each side and having a thickness (t) of 100 nm with a microtome. Next, the resulting thin sample is placed on a metal plate and a metal terminal having a pressing surface area S of 100 μm² is pressed downward to the first region of the thin sample. Under such a state, a voltage of 1 V is applied between the metal terminal and the metal plate with an electrometer ("6517B", trade name; product of KEITHLEY) to determine resistance R. By inserting the resistance R in the following equation, a volume resistivity Rv (Ω·cm) is calculated.

$$Rv = R \times S/t$$

It can be confirmed further that the first region is electrical insulating and the second region has conductivity higher than that of the first region by charging the outer surface of the developing roller including the first region and the second region and then measuring the residual potential distribution of it.

The residual potential distribution can be obtained by sufficiently charging the outer surface of the developing roller with a charging device such as corona charge device and then measuring the residual potential distribution of the thus-charged outer surface of the developing roller with an electrostatic force microscope (EFM), surface potential microscope (KFM) or the like.

The electrical insulating properties of the electrical insulating part constituting the first region or the conductivity of the electro-conductive layer constituting the second region can also be evaluated by potential damping time constant of residual potential (which may also be called "time constant" hereinafter), as well as volume resistivity. The time constant of a residual potential is defined as a time required for damping of a residual potential to 1/e of an initial value and it becomes an indicator how easily a charged potential is retained, where e is the base of natural logarithm.

The time constant of the electrical insulating part equal to or more than 60 seconds is preferred because the electrical insulating part is charged speedily and at the same time, potential obtained by charging can be retained easily.

The time constant of the electro-conductive layer less than 6.0 seconds is preferred because due to suppression of charging of the electro-conductive layer, a potential difference can be caused easily between the electro-conductive layer and the charged electrical insulating part and a gradient force can be easily exhibited.

It is to be noted that in the measurement of the time constant, when a residual potential is substantially 0 V at the measurement starting point in the below-described measuring method, in other words, when a potential has been completely damped at the measurement starting point, the time constant at the measurement point is regarded as less than 6.0 seconds.

The time constant of a residual potential can be determined, for example, by sufficiently charging the outer surface of a developing roller by using a charging device such as corona discharge device and then measuring a time-dependent change of the residual potential of the first region and the second region of the charged outer surface of the developing roller by an electrostatic force microscope (EFM).

(Measurement of Residual Potential Distribution)

One examples of the measurement of residual potential distribution will hereinafter be shown.

The residual potential distribution was determined by corona-charging the outer surface of the developing roller on the thin sample with a corona discharge device and then measuring the residual potential of the outer surface by an electrostatic force microscope ("MODEL 1100TN", trade name; product of Trek Japan) while scanning the thin sample.

Described specifically, first, the thin sample was placed on a smooth silicon wafer with a surface of it including the outer surface of the developing roller up and was left to stand for 24 hours in an environment of a temperature of 23° C. and a relative humidity of 50%. Next, the silicon wafer having the thin sample thereon was set, in the same environment, on a high-precision XY stage loaded in the electrostatic force microscope. As the corona discharge device, that having a wire-grid electrode distance of 8 mm was used. The corona discharge device was placed at a position to give a distance of 2 mm between the grid electrode and the surface of the silicon wafer. Then, the silicon wafer was grounded and voltages of −5 kV and −0.5 kV were applied to the wire and the grid electrode, respectively, from an external power source. After the application was started, the thin sample was scanned at a speed of 20 mm/sec in parallel to the surface of the silicon wafer by using the high-precision XY stage so that it passed just below the corona discharge device and thus, the outer surface of the developing roller on the thin sample was corona-charged.

Then, by using the high-precision XY stage, the thin section was moved to just below a cantilever of the electrostatic force microscope. Next, by measuring the residual potential of the outer surface of the developing roller corona-charged while scanning using the high-precision XY stage, a residual potential distribution was measured. The following are measurement conditions.

Measurement environment: temperature of 23° C. and relative humidity of 50%.
Time from passage of the measurement point just below the corona discharge device to start of measurement: 1 min.
Cantilever: cantilever for Model 1100TN (Model number: Model 1100TNC-N, product of Trek Japan).
Gap between a surface to be measured and a tip of cantilever: 10 μm.
Measurement range: 99 μm×99 μm.
Measurement interval: 3 μm×3 μm.

By confirming the presence or absence of the residual potential in two or more regions on the thin sample based on the residual potential distribution obtained by the above-described measurement, whether the region was an electrical insulating first region or a second region having conductivity higher than that of the first region was checked. More specifically, by regarding one of the two or more regions including a portion whose absolute value of the residual potential was less than 1 V as the second region and another one including a portion whose absolute value of the residual potential was larger by 1 V or more than the absolute value of the residual potential of the second region as the first region, their presence was confirmed.

The above-described measurement method of residual potential distribution is one example and the apparatus or conditions may be changed to those suited for confirmation of the presence or absence of residual potential of these two or more regions depending on the size, distance, time constant or the like of the electrical insulating part or electro-conductive layer.

(Measurement of Time Constant of Residual Potential)

One measurement example of the time constant of a residual potential will next be shown.

The time constant of a residual potential was determined by corona-charging the outer surface of the developing roller by using a corona discharge device, measuring a time-dependent change of the residual potential on the electrical insulating part or the electro-conductive layer present on the outer surface of the developing roller by an electrostatic force microscope ("MODEL 1100TN", trade name; product of Trek Japan) and fitting it in the following formula (1). The measurement point of the electrical insulating part was a point at which the absolute value of the residual potential was largest in the first region confirmed by the measurement of the residual potential distribution, while the measurement point of the electro-conductive layer was a point at which the residual potential became substantially 0 V in the second region confirmed by the measurement of the residual potential.

The thin sample used for the measurement of the residual potential distribution was placed on a smooth silicon wafer with the surface including the outer surface of the developing roller up and it was left to stand for 24 hours in an environment of a room temperature of 23° C. and a relative humidity of 50%.

Then, the silicon wafer having the thin sample thereon was placed on a high-precision XY stage loaded in the electrostatic force microscope in the same environment. As the corona discharge device, that having a wire-grid electrode distance of 8 mm was used. The corona discharge device was placed at a position to give a distance of 2 mm between the grid electrode and the surface of the silicon wafer. Then, the silicon wafer was grounded and voltages of −5 kV and −0.5 kV were applied to the wire and the grid electrode, respectively, from an external power source. After the application was started, the thin sample was scanned at a speed of 20 mm/sec in parallel to the surface of the silicon wafer by using the high-precision XY stage so that it passed just below the corona discharge device and thus, the thin sample was corona-charged.

Then, by using the high-precision XY stage, the measurement point of the electrical insulating part or electro-conductive layer was moved to just below the cantilever of the electrostatic force microscope and a time-dependent change of a residual potential was measured. For the measurement, the electrostatic force microscope was used. The following are measurement conditions.

Measurement environment: temperature of 23° C. and relative humidity of 50%.
Time from passage of the measurement point just below the corona discharge device to start of measurement: 15 seconds.
Cantilever: cantilever for Model 1100TN (Model number: Model 1100TNC-N, product of Trek Japan)
Gap between a surface to be measured and a tip of cantilever: 10 μm
Measurement frequency: 6.25 Hz
Measurement time: 1000 seconds Based on the time-dependent change of a residual potential obtained by the above-described measurement, data were fit to the following formula (1) by the least-squares method to determine a time constant τ.

$$V_0 = V(t) \times \exp(-t/\tau) \quad (1)$$

t: elapsed time (sec) after the measurement point passes just below the corona discharge device.
$V_0$: initial potential (potential at t=0 sec) (V).
V(t): residual potential (V) t seconds after the measurement point passes just below the corona discharge device.
τ: time constant (sec) of residual potential.

The time constant τ of a residual potential is measured at 3 points in the longer direction×3 points in the circumferential direction of the outer surface of the developing roller, that is, 9 points in total and an average value of them is used as a time constant of the residual potential of the electrical insulating part or the electro-conductive layer. It is to be noted that when the measurement of the electro-conductive layer includes a measurement point whose residual potential is substantially 0 V at the measurement start time, that is, 15 seconds after corona charge, the time constant is considered as less than the average value of the time constant of the remaining measurement points. When the potential of all the measurement points at the measurement start time is substantially 0 V, the time constant is considered as below the measurement lower limit.

[Average Percent of Exposure]

Figure 2:
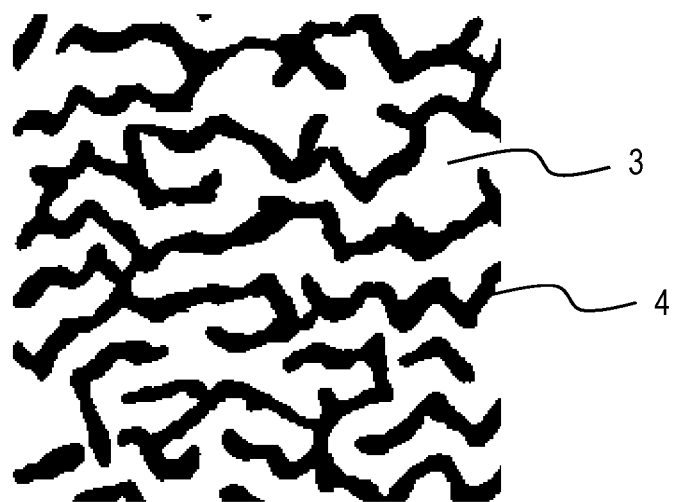
FIG. 2 is a schematic view showing one example of surface observation of the electrophotographic member according to the present disclosure.

First, a square region (FIG. 2) 1000 μm on a side is put on the outer surface of the electrophotographic member (developing roller) so that one side of the square region is parallel to the longer direction of the electrophotographic member. The insulating part 4 which is the first region and the second region which is the surface of the electro-conductive layer 3 are placed as shown in FIG. 2.

Next, an effect of the percent of exposure of the second region on the charging property to a toner and the toner conveyance will be described. The investigation by the present inventors has revealed that not the insulating first region but the electro-conductive second region has a larger contribution to the charging to the toner. This means that when the percent of exposure of the second region is 30% or more, a developing roller having appropriate charging ability to toner can be obtained. The percent of exposure is preferably 40% or more, more preferably 50% or more. Since the toner conveyance force derives from the gradient force generated between the insulating region and the electro-conductive region, when the second region has 80 percent of exposure or less, the resulting developing roller has an adequate insulating region and therefore has excellent toner conveyance. In this case, the percent of exposure is preferably 70% or less, more preferably 60% or less. A total area of the second region in the area of the square region is therefore 30% or more to 80% or less, preferably 40% or more to 70% or less, more preferably 50% or more to 60% or less.

[Line Segment LS]

Figure 3B:
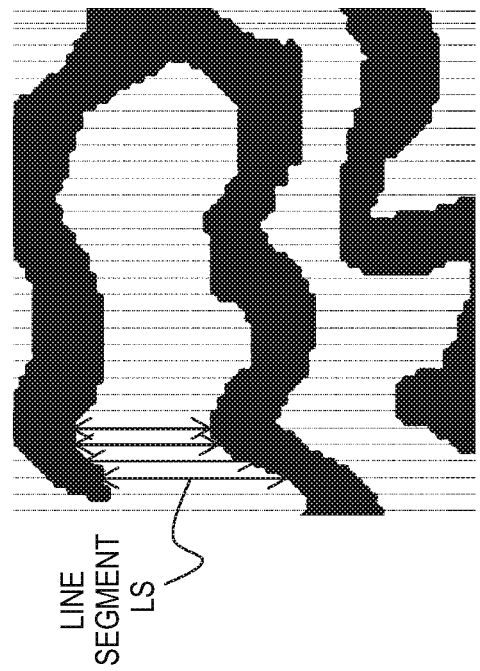
FIG. 3B is another schematic view showing one example of measuring line segment LS in the present disclosure.
Figure 3A:
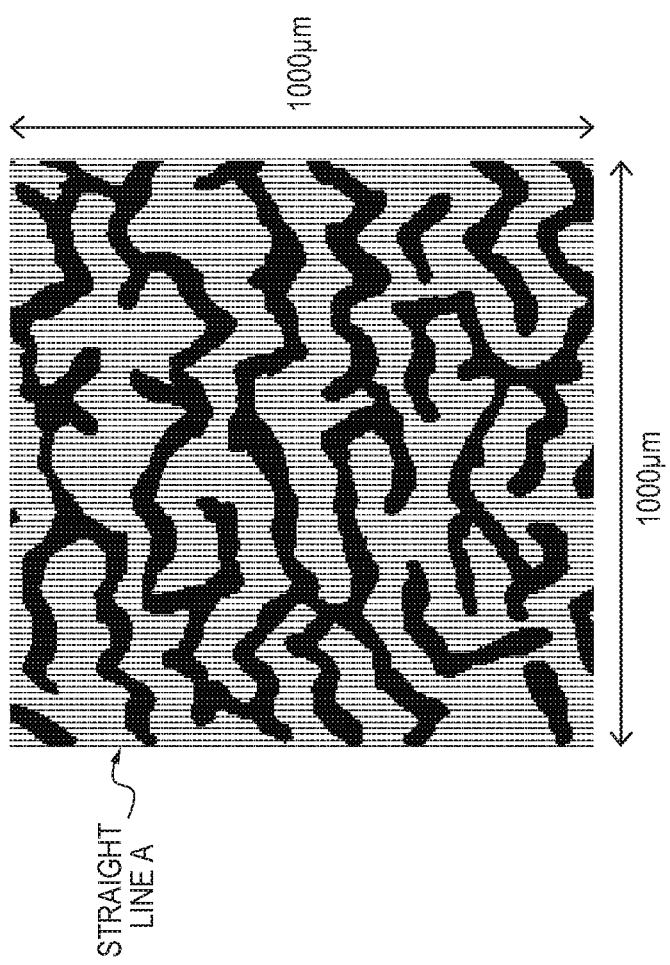
FIG. 3A is a schematic view showing one example of measuring line segment LS in the present disclosure.

Next, as shown in FIG. 3A, 200 straight lines A having a length of 1000 μm are drawn at an interval of 5 μm in a direction orthogonal to the longer direction of the electrophotographic member (that is, in a circumferential direction of the developing roller). As shown in FIG. 3B, a portion of each of the straight lines A overlapping with the second region is defined as a line segment LS. In other words, each the line segment LS starts from the end of one of the first regions or end of the square region, passes over the second region only once and reaches, at the other end, another end of the first region or the square region. The term "length of the line segment LS" means the length of each of the line segment LS.

Of 200 straight lines A, a plurality of the straight lines passes the second region at least once. This means a plurality of the line segment LS can be obtained from one square region. The number of the line segment LS having a length of 200 μm or more in the total number of the line segment LS is 5% or less, preferably 4% or less, more preferably 3% or less.

Next the reason why the fewer the long line segment among the line segment LS, the more the above-described fog is reduced. By reducing the length of the line segment LS (meaning a continuous distance of the second region of the developing roller in the circumferential direction), transfer of the charge of the toner at the contact part between the photoreceptor and the developing roller can be suppressed. Described specifically, transfer of the charge of the toner at the contact portion between the photoreceptor and the developing roller occurs due to rolling of the toner in the (electro-conductive) second region by sliding and rubbing of the photoreceptor and the developing roller. On the other hand, when the continuous distance of the second region in the roller circumferential direction is made shorter, the rolling of the toner at the contact part between the photoreceptor and the developing roller is suppressed, the transfer of the charge of the toner is hindered and as a result, fog is reduced.

The number of the line segment LS having a length of more than 0 μm to 125 μm or less in the total number of the line segment LS is preferably 80% or more from the standpoint of reducing fog. It is more preferably 90% or more, more preferably 95% or more. The reason is because the width of the (electro-conductive) exposed part in the circumferential direction decreases so that the rolling of the toner at the contact part between the photoreceptor and the developing roller is suppressed further, making it possible to suppress transfer of the toner charge.

[Insulating First Region]

An arithmetic mean value of the area of the first region equal to or more than 100000 μm$^2$ or more is preferred because fog can be reduced further. It is more preferably 200000 μm$^2$ or more, still more preferably 300000 μm$^2$ or more. The reason is because as the area of the first region is larger, the rolling of the toner in the second region can be suppressed, transfer of the triboelectric charge of the toner can be suppressed and fog can be reduced.

The first region having a protrusion on the surface of the electrophotographic member is preferred because fog is reduced further. The reason is because when the first region has a protrusion, the rolling of the toner is suppressed. Compared with the first region without a protrusion (the first region with a recess or flat shape), rolling of the toner over a plurality of exposure parts does not occur. Therefore, transfer of the triboelectric charge of the toner is suppressed and fog is reduced further.

Suppose that the surface potentials of the first region and the second region measured using a scanning probe microscope in an environment of a temperature of 23° C. and a relative humidity of 50% are V1 and V2, respectively. Surface potentials V1 and V2 falling within a range of from −0.70 to −0.50 V and within a range of from 0.00 to +0.50 V, respectively, are preferred from the standpoint of making appropriate the image density in a high-temperature and high-humidity environment and image gradation properties in a low-temperature and low-humidity environment. More preferably, V1 and V2 are from −0.65 to −0.55 V and from 0.20 to 0.40 V, respectively. The reason is because at the surface potentials within the above-described ranges, the gradient force of the electrophotographic member works sufficiently, making it possible to improve the toner conveyance and suppress the electrophotographic member from being excessively charged.

In addition, the smaller the variation, in the longer direction of the electrophotographic member, in the placement of the first region and the second region which satisfies the above-described conditions, the more preferred from the standpoint of reducing fog. The reason is because a region with short line segment LS exists stably over the longer direction of the electrophotographic member so that appropriate charge of the toner can be retained.

The first region and the second region are different in the surface of the exposure part and surface morphology so that they can be understood as regions having a difference in the intensity of reflectance and can be discriminated using an optical microscope or electron microscope. In addition, since the first region and the second region are different in resistivity, they can be discriminated more clearly by using an electrostatic force microscope (EFM) in combination. Usable are, for example, "DIGITAL MICROSCOPE VHX-5000" (trade name; product of Keyence) as the optical microscope, "JSM-7800FPRIME" (trade name; product of JEOL) as the electron microscope and "MODEL1100TN" (trade name; product of Trek Japan) as the electrostatic force microscope.

By binarizing the observation image obtained above, the line segment LS can be determined. Binarization can be performed more easily by selecting optical conditions of the optical microscope so as to widen a difference in intensity of reflectance between the first region and the electro-conductive layer. For determination of the line segment LS, a commercially available or ordinarily usable image processing software can be used. As such an image processing software, "Image J ver. 1.45" (developer: Wayne Rasband, National Institutes of Health, NIH) is usable.

Examples of the material constituting the first region include resins and metal oxides. Of these, resins which can be easily charged are preferred. Specific examples include acrylic resins, polyolefin resins, epoxy resins and polyester resins.

Of these, acrylic resins can easily adjust the volume resistivity of the first region to fall within the above-described range so that they are preferred. Specific examples of the acrylic resins include polymers and copolymers using the following monomer as a raw material. More specific examples include methyl methacrylate, 4-tert-butylcyclohexanol acrylate, stearyl acrylate, lauryl acrylate, 2-phenoxyethyl acrylate, isodecyl acrylate, isooctyl acrylate, isobornyl acrylate, 4-ethoxylated nonylphenol acrylate and ethoxylated bisphenol A diacrylate.

Examples of a method of forming the first region on the electro-conductive layer include a method of applying a first region forming material onto the electro-conductive layer and forming the first region by using a printing method such as ink jet method or screen printing method. Additional examples include a method of wet coating a first region forming material (coating material) on the electro-conductive layer by a coating method such as spraying or dipping and a method of mixing respective materials constituting the first region and the electro-conductive layer and causing phase separation under optimum conditions.

In the ink jet method, the first region forming coating material is applied to an outer surface of the electro-conductive layer by this ink jet method so as to allow the line segment LS to satisfy the scope of the present disclosure.

In the wet coating method, the electrophotographic member having the first region can be formed, for example, by applying the first region forming coating material onto the electro-conductive layer by wet coating and allowing the coating material to repel on the surface of the electro-conductive layer. Formation of the first region having a predetermined shape by allowing the coating material to repel on the surface of the electro-conductive layer can be controlled, for example, by adjusting a contact angle of the coating material on the surface of the electro-conductive layer, adjusting the molecular weight of the solid content in the coating material or selecting an appropriate solvent for the coating material. In the dipping method, the shape of the first region can be controlled by adjusting the dipping time of the electro-conductive layer in the coating material or a wind speed in the vicinity of the surface of the electrophotographic member after the dipped electro-conductive layer is pulled out.

The contact angle of the coating material with respect to the surface of the electro-conductive layer is preferably 10° or more to 90° or less, more preferably 20° or more to 50° or less. By adjusting the contact angle to 10° or more, an electrophotographic member whose second region has an adequate area can be obtained. By adjusting the contact angle to 90° or less, an electrophotographic member whose first region has an adequate area can be obtained.

The molecular weight of the solid content (resin) of the first region forming coating material is preferably 2500 or more, more preferably 10000 or more. By increasing the molecular weight, the coating material applied onto the surface layer is repelled excessively and the line segment LS of second region are suppressed from becoming long.

By selecting, as a solvent for coating material, a solvent having a boiling point of 50° C. or more to 200° C. or less, it is possible to adjust a drying speed on the surface layer of the coating material and thereby facilitating control of the area S of the first region. More specifically, an increase in the boiling point can retard the drying of the coating material and therefore increase the area S. Examples of such a solvent include acetone (boiling point: 56.1° C.), methanol (bp: 64.5° C.), hexane (bp: 68.7° C.), ethanol (bp: 78.3° C.), methyl ethyl ketone (MEK, boiling point: 79.6° C.), cyclohexane (bp: 80.7° C.), heptane (bp: 98.4° C.), toluene (bp: 110.6° C.), methyl isobutyl ketone (MiBK, bp: 116.2° C.), and diisobutyl ketone (DiBK, bp: 168.4° C.).

Of these, acetone, MEK and MiBK are preferred from the standpoint of solubility of the first region constituting material or viscosity of the solution.

The drying speed may be adjusted, for example, by adding a monomer or the like as a liquid component other than the solvent.

[Electro-Conductive Substrate]

The substrate has conductivity and has a function of supporting the electro-conductive layer to be provided thereon. Examples of the material include metals such as iron, copper, aluminum and nickel and alloys containing any of these metals such as stainless steel, duralumin, brass, bronze and free-cutting steel. The surface of the electro-conductive substrate can be plated with chromium or nickel without damaging its conductivity. As the electro-conductive substrate, a substrate obtained by coating the surface of a base material made of a resin with a metal to impart surface conductivity to it or that made of an electro-conductive resin composition can be used. To the surface of the electro-conductive substrate, a known adhesive may be applied as needed for improving the adhesion with an elastic layer provided on the outer peripheral surface thereof. The electro-conductive substrate preferably has a columnar or hollow cylindrical shape.

[Electro-Conductive Layer]

The electro-conductive layer contains an elastic material such as resin and rubber. Examples of the resin include polyamide, nylon, polyurethane resins, urea resins, polyimide, melamine resins, fluoroplastics, phenolic resins, alkyd resins, polyester, polyether and acrylic resins and mixtures thereof.

Examples of the rubber used include ethylene-propylene-diene copolymer rubbers (EPDM), acrylonitrile-butadiene rubbers (NBR), chloroprene rubbers (CR), natural rubber (NR), isoprene rubbers (IR), styrene-butadiene rubbers (SBR), fluororubbers, silicone rubbers, epichlorohydrin rubbers, hydrides of NBR and urethane rubbers.

Of these, polyurethane resins are preferred because they have excellent triboelectric charging performance to the toner and excellent flexibility so that they can easily get opportunities to come into contact with a toner and at the same time, they have abrasion resistance.

When the electro-conductive layer has a constitution made of two or more layers, using the polyurethane resins also as an outermost surface electro-conductive layer (upper layer) is preferred. Examples of the polyurethane resins include ether-based polyurethane resins, ester-based polyurethane resins, acrylic polyurethane resins, fluorine-based polyurethane resins, carbonate-based polyurethane resins and olefin-based urethane resins.

Polyurethane resins can be prepared using polyol and isocyanate and if necessary, a chain extender may be used. Examples of the polyol which is a raw material of the polyurethane resin include polyether polyol, polyester polyol, polycarbonate polyol, polyolefin polyol and acrylic polyol and mixtures thereof. Examples of the isocyanate which is another raw material of the polyurethane resin include tolylene diisocyanate (TDI), diphenylmethane diisocyanate (MDI), naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethylxylylene diisocyanate (TMXDI) and cyclohexane diisocyanate and mixtures thereof. Examples of the chain extender which is a further raw material of the polyurethane resin include bifunctional low-molecular diols such as ethylene glycol, 1,4-butanediol and 3-methylpentanediol and trifunctional low-molecular triols such as trimethylolpropane and mixtures thereof.

When the electro-conductive layer is constituted of two or more stacked layers, a material constituting an electro-conductive layer (lower layer) on the electro-conductive substrate is preferably a silicone rubber. Examples of the silicone rubber include polydimethylsiloxane, polymethyltrifluoropropylsiloxane, polymethylvinylsiloxane and polyphenylvinylsiloxane and copolymers of these siloxanes. These resins and rubbers may be used either singly or in combination of two or more if necessary. The material of the resin or rubber can be identified by measuring it with a Fourier transform infrared spectrophotometer.

The electro-conductive layer may further contain various additives such as particles, conducting agent, plasticizer, filler, extender, vulcanizing agent, vulcanizing aid, cross-linking aid, curing inhibitor, antioxidant, anti-aging agent and processing aid, if necessary. These optional components can be mixed in an amount not damaging the function of the electro-conductive layer.

By incorporating particles in the electro-conductive layer, a protrusion can be formed on the surface of the electrophotographic member. The particles which can be added to the electro-conductive layer preferably have a volume average particle size of 1 µm or more to 30 µm or less. It is to be noted that the particle size can be measured by observing the surface of the cross-section by a scanning electron microscope (Schottky field emission scanning electron microscope "JSM-7800FPRIME", trade name; product of JEOL".

An amount of the particles contained in the electro-conductive layer is preferably 1 part by mass or more to 50 parts by mass or less based on 100 parts by mass of the elastic material such as resin or rubber. As the particles, fine particles made of a resin such as polyurethane resin, polyester, polyether, polyamide, acrylic resin or polycarbonate can be used. Of these, polyurethane resin particles are preferred because they are flexible and therefore a protrusion is flattened largely and exhibits complex deformation easily when the electrophotographic member is brought into contact with another member and they are effective for preventing contamination with a toner.

The electro-conductive layer can be provided as an electro-conductive elastic layer obtained by mixing the elastic material with a conductivity imparting agent such as electronic conductive substance or ionic conductive substance. Examples of the electronic conductive substance include: electro-conductive carbons, for example, carbon black such as KETJENBLACK EC and acetylene black, carbons for rubber such as SAF (Super Abrasion Furnace), ISAF (Intermediate SAF), HAF (High Abrasion Furnace), FEF (Fast Extruding Furnace), GPF (General Purpose Furnace), SRF (Semi-Reinforcing Furnace), FT (Fine Thermal) and MT (Medium Thermal), carbons for color (ink) subjected to oxidizing treatment and metals such as copper, silver and germanium and metal oxides thereof. Of these, electro-conductive carbons are preferred because even a small amount of them can control the electro-conductivity easily. Examples of the ionic conductive substance include inorganic ionic conductive substances such as sodium perchlorate, lithium perchlorate, calcium perchlorate and lithium chloride and organic ionic conductive substances such as modified aliphatic dimethylammonium ethosulfate and stearylammonium acetate.

Examples of the filler include silica, quartz powder and calcium carbonate.

These materials for the electro-conductive layer can be mixed using a dynamic mixing apparatus such as single screw continuous kneader, twin screw continuous kneader, twin roll, kneader mixer or tri-mixer or a static mixing apparatus such as static mixer.

Examples of a method of forming an electro-conductive layer on an electro-conductive substrate include a method of forming with a mold, an extrusion method, an injection molding method and a method of forming by coating. A method of forming a first region having a protrusion will be described later. In the method of forming with a mold, an insert piece for retaining an electro-conductive substrate (shaft core) in an insert piece is fixed at both ends of the cylindrical mold and an inlet is formed in the insert piece. Then, after the shaft core is placed in the mold and the materials for electro-conductive layer are poured from the inlet, the mold is heated at a temperature for curing the materials. Then, the cured product can be removed from the mold. In the extrusion method, a shaft core and materials for elastic layer are co-extruded using a crosshead extruder and then, these materials are cured. Thus, an electro-conductive layer can be formed around the shaft core.

When the electro-conductive layer is constituted of two or more stacked layers, the surface of the electro-conductive layer (lower layer) on the side of the shaft core may be surface polished or can also be modified by a surface modifying method such as corona treatment, frame treatment, or excimer treatment in order to improve adhesion between these layers.

[Shape of Second Region]

A means for forming the second region will hereinafter be described.

The shape of the second region can be controlled by the shape of the first region. For example, when the first region is formed by a wet coating method, the shape of the second region (not covered with the first region) can be adjusted as needed to satisfy the scope of the present disclosure by controlling the contact angle of the first region forming coating material with respect to the electro-conductive layer or the repelling degree. More specifically, the shape of the first region can be controlled by adjusting the solid content or molecular weight of the first region forming coating material, dipping time of the electro-conductive layer in the first region forming coating material, wind speed around the electro-conductive layer at the time of coating or contact angle of the first region forming coating material with respect to the electro-conductive layer. As a result, the shape of the second region (other than the first region) can be controlled.

For example, the higher the solid content of the first region forming coating material at the time of wet coating, the lower the percent of exposure becomes. More specifically, the higher the solid content of the first region forming coating material, the higher a drying speed of the coating material. Then, before the coating material is repelled, the coating material becomes dry and has an increased viscosity and the first region is formed. As a result, the first region spreads in wet form, leading to a reduction in the percent of exposure.

The length of the line segment LS can be controlled by the dipping time of the electro-conductive layer in the first region forming coating material or the wind speed around the electro-conductive layer at the time of wet coating. More specifically, the longer the dipping time of the electro-conductive layer in the first region forming coating material, the more the electro-conductive layer swells with the first region forming coating material and the slower the drying speed of the coating material becomes. In addition, the smaller the wind speed against the dipped electro-conductive layer, the slower the drying speed of the coating material becomes. When the drying speed of the coating material becomes slower, the coating material is dried while being repelled. This decreases the width of the first region, resulting in an increase in the length of the line segment LS. On the contrary, an increase in the drying speed of the coating material by changing the dipping time or wind speed, the line segment LS can be made shorter.

Further, the length of the line segment LS can be controlled also by controlling the molecular weight of the material used for the first region forming coating material. More specifically, the larger the molecular weight of the material, the higher the viscosity of the coating material even when the solid content of the coating material is same. As a result, compared with using a material having a small molecular weight, the coating material just after applied onto the electro-conductive layer is not easily repelled. The first region therefore has an increased area, while the second region has a decreased area.

[Electrophotographic Process Cartridge and Electrophotographic Image Forming Apparatus]

The electrophotographic image forming apparatus according to one aspect of the present disclosure has an electrophotographic photoreceptor for forming and carrying thereon an electrostatic latent image, a charging unit for making the electrophotographic photoreceptor chargeable, and an exposure unit for forming the electrostatic latent image on the charged electrophotographic photoreceptor. The electrophotographic image forming apparatus further has a developing unit for developing the electrostatic latent image with a toner to form a toner image and a transfer unit for transferring the toner image to a transfer material. The developing unit has the above-described electrophotographic member, for example, as a developing roller.

Figure 5:
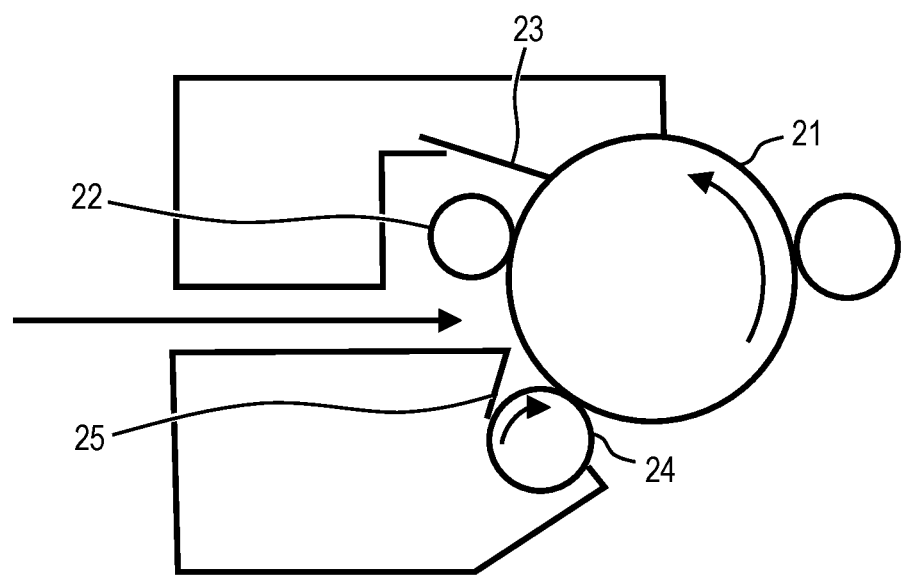
FIG. 5 is a schematic view showing one example of the process cartridge according to the present disclosure.
Figure 6:
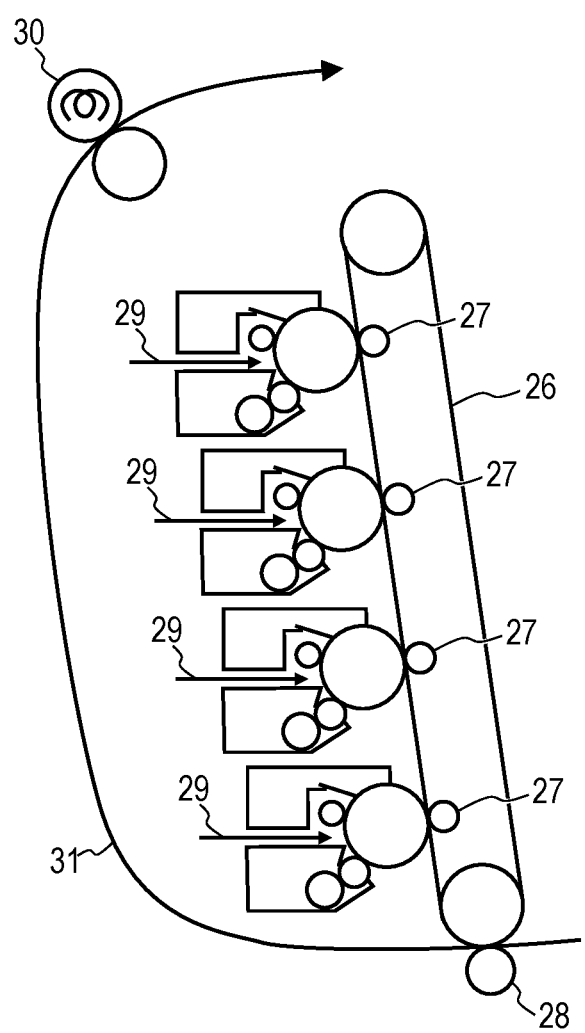
FIG. 6 is a schematic view showing one example of the electrophotographic image forming apparatus according to the present disclosure.

FIG. 6 schematically shows one example of the electrophotographic image forming apparatus according to the present aspect. FIG. 5 schematically shows an electrophotographic process cartridge to be loaded in the electrophotographic image forming apparatus shown in FIG. 6. This electrophotographic process cartridge has therein an electrophotographic photoreceptor 21, a charging member 22, a developing roller 24 and a toner regulating member 25. The electrophotographic process cartridge is detachably mounted on the electrophotographic image forming apparatus shown in FIG. 6.

The electrophotographic photoreceptor 21 is charged uniformly (primarily charged) by the charging member 22 connected to a bias supply not shown. At this time, the charge potential of the electrophotographic photoreceptor is, for example, −800 V or more to −400 V or less. Next, an exposure light 29 for writing an electrostatic latent image is irradiated from an exposure device not shown and the electrostatic latent image is formed on the surface of the photoreceptor. As the exposure light, either an LED light or a laser light can be used. The surface potential of the exposed portion of the electrophotographic photoreceptor is, for example, −200 V or more to −100 V or less.

Next, a negative-polarity charged toner is given to the electrostatic latent image (developed) by the developing roller 24 to form a toner image on the electrophotographic photoreceptor and the electrostatic image is converted into a visible image. At this time, a voltage of, for example, −500 V or more to −300 V or less is applied to the developing roller by a bias supply not shown. It is to be noted that the developing roller is in contact with the electrophotographic photoreceptor with a nip width of 0.5 mm or more to 3 mm or less.

The toner image developed on the electrophotographic photoreceptor is then primarily transferred to an intermediate transfer belt 26. A primary transfer member 27 is in contact with the rear surface of the intermediate transfer belt 26. By applying a voltage of, for example, +100 V or more to +1500 V or less to the primary transfer member 27, the negative-polarity toner image is primarily transferred from the image carrier to the intermediate transfer belt 26. The primary transfer member 27 may be either a roller form or a blade form.

When the electrophotographic image forming apparatus is a full-color image forming apparatus, each of the above-described charging, exposure, development and primary transfer steps is typically performed for each of yellow, cyan, magenta and black colors. In the electrophotographic image forming apparatus shown in FIG. 6, therefore, a total of four electrophotographic process cartridges having therein these four color toners, respectively, are mounted detachably on the main body of the electrophotographic image forming apparatus. The above charging, exposure, development and primary transfer steps are performed successively with a predetermined time difference to create an overlapped state of four-color toner images on the intermediate transfer belt 26 for expressing a full color image.

The toner images on the intermediate transfer belt 26 are conveyed to a position facing a secondary transfer member 28 with the rotation of the intermediate transfer belt 26. Between the intermediate transfer belt 26 and the secondary transfer member 28, a recording sheet is conveyed along a recording sheet conveying route 31 at a predetermined timing and by application of a secondary transfer bias to the secondary transfer member 28, the toner images on the intermediate transfer belt 26 are transferred to the recording sheet. At this time, the bias voltage applied to the secondary transfer member 28 is, for example, +1000 V or more to +4000 V or less. The recording sheet onto which the toner images are transferred by the secondary transfer member 28 is conveyed to a fixing device 30 and after the toner images on the recording sheet are melted and fixed onto the recording sheet, the resulting recording sheet is ejected from the electrophotographic image forming apparatus to complete the printing operation.

According to one aspect of the present disclosure, an electrophotographic member capable of suppressing fogging in a high-temperature and high-humidity environment even when used in a torque-reduced image forming apparatus and useful for providing a high quality image can be obtained.

According to another aspect of the present disclosure, an electrophotographic process cartridge and an electrophotographic image forming apparatus capable of stably forming a high-quality electrophotographic image can be obtained.

EXAMPLE

By Manufacturing Examples and Examples, the electrophotographic member and the like according to the present disclosure will hereinafter be described specifically. The present disclosure is however not limited to or by them.

<Preparation of Electro-Conductive Substrate>

The surface of a free-cutting steel was subjected to electroless nickel plating. A primer ("DY35-051", trade name; product of Dow Corning Toray) was applied to a solid shaft core having an outer diameter of 6 mm and a length of 259.9 mm, followed by heating and baking at a temperature of 150° C. for 20 minutes to prepare an electro-conductive substrate.

<Preparation of Electro-Conductive Silicone Rubber Layer>

The electro-conductive substrate thus obtained was placed in a mold and an addition curing silicone rubber composition obtained by mixing the materials shown in Table 1 in a mixer (Tri-mix TX-15", trade name; product of Inoue MFG) was poured in the cavity of the mold heated to a temperature of 115° C. After pouring, the mold was heated at a temperature of 120° C. for 10 minutes to cure the addition curing silicone rubber composition. The electro-conductive substrate having therearound the cured silicon rubber layer was taken out from the mold and the silicone rubber layer was heated further at a temperature of 150° C. for 15 minutes to perform secondary curing. In such a manner, a 1.99 mm-thick electro-conductive silicone rubber layer was formed at the outer periphery of the electro-conductive substrate.

TABLE 1

| | Material | Part by mass |
|---|---|---|
| Electro-conductive layer material 1 | Silicone rubber material in liquid form (SE6724A/B, trade name; product of Dow Corning Toray) | 100 |
| | Carbon black ("Toka Black #7360SB", trade name; product of Tokai Carbon) | 10 |
| | Platinum catalyst ("SIP6832.2", trade name; product of Gelest) | 0.1 |

* The numeral shown in the column of "part by mass" in Table is a solid content mass (part by mass) of each material.

<Preparation of Isocyanate-Terminated Prepolymer (a)>

An isocyanate-terminated prepolymer (a) to be used for the manufacture of a developing roller of Examples and Comparative Examples was prepared by the following method.

In a nitrogen atmosphere, 140.0 parts by mass of polyether-based polyol ("PTGL1000", trade name; product of Hodogaya Chemical) was gradually added dropwise to 38.6 parts by mass of polymeric MDI ("Millionate MT", trade name; product of TOSOH) in a reaction vessel. During the dropwise addition, the temperature in the reaction vessel was kept at 72° C. After completion of the dropwise addition, a reaction was performed at a temperature of 72° C. for 2 hours. The reaction mixture thus obtained was cooled to a room temperature to obtain 110 parts by mass of an isocyanate-terminated prepolymer (a) having an isocyanate content of 4.5 mass %.

<Preparation of Electro-Conductive Urethane Resin Forming Coating Material>

[Preparation of Coating material No. T-1]

The materials shown in Table 2 were added at the mixing ratio shown in Table 2 to 400 parts by mass of methyl ethyl ketone (MEK) to give a total solid content of 30 mass % and the resulting mixture was stirred and dispersed in a ball mill to prepare Electro-conductive urethane resin layer forming coating material No. T-1.

[Preparation of Coating Materials Nos. T-2 to T-9]

In a manner similar to that used for the preparation of Coating material No. T-1 except that the materials and mixing ratio thereof were changed as shown below in Table 2, Coating materials Nos. T-2 to T-9 were prepared.

TABLE 2

| | | Coating material No. | | | | | | | | |
|---|---|---|---|---|---|---|---|---|---|---|
| | | T-1 | T-2 | T-3 | T-4 | T-5 | T-6 | T-7 | T-8 | T-9 |
| Electro-conductive urethane resin layer forming material (part by mass) | Polyether polyol ("PTGL1000", trade name; product of Hodogaya Chemical) | 35 | 35 | 35 | 35 | 35 | 35 | 35 | 35 | 35 |
| | Isocyanate-terminated prepolymer (a) | 65 | 65 | 65 | 65 | 65 | 65 | 65 | 65 | 65 |
| | Polyether-modified silicone oil ("TSF4440", trade name; product of Momentive Performance Materials Japan) | 3 | 3 | 3 | 3 | 10 | 0 | 0.01 | 3 | 3 |
| | Resin particles ("C-400, clear", trade name; product of Negami Chemical Industries | 6 | 10 | 8 | 9.5 | 14 | 6 | 6 | 11 | 13 |
| | Carbon black ("MA100", trade name; product of Mitsubishi Chemical) | 16 | 16 | 16 | 16 | 16 | 16 | 16 | 16 | 16 |

<Preparation of Electro-Conductive Member>

[Preparation of Electro-Conductive Member D-1]

The electro-conductive substrate having the electro-conductive silicone rubber layer formed thereon was dipped in Coating material No. T-1 in the following procedure to form a coating film of Coating material No. T-1 on the electro-conductive silicone rubber layer.

Described specifically, the substrate was dipped in Coating material No. T-1 by holding the upper end portion of the substrate with the longer direction of the substrate as a vertical direction and then it was pulled up to form a coating film of Coating material No. T-1 on the electro-conductive silicone rubber layer. The dipping time was set at 9 seconds and as the pulling-up speed from Coating material No. T-1, an initial speed and a final speed were set at 30 mm/sec and 20 mm/sec, respectively. The pulling-up speed from the initial speed to the final speed was changed linearly with respect to time.

The substrate having a coating film of Coating material No. T-1 formed thereon was placed in an oven and heated at a temperature of 80° C. for 15 minutes. Then, the temperature of the oven was changed to 140° C. and the substrate was heated for further 2 hours to cure the film and an electro-conductive urethane resin layer having a film thickness of 10.0 μm was formed on the electro-conductive silicon rubber layer. A member having the electro-conductive silicone rubber layer and the electro-conductive urethane resin layer stacked on the outer periphery of the substrate will hereinafter be called "Electro-conductive member D-1".

Next, an arithmetic mean roughness was measured at any nine points on the surface of the electro-conductive urethane resin layer serving as the surface of Electro-conductive member D-1. The arithmetic mean roughness was measured with a 50× objective lens by using a laser microscope ("VK-8700", trade name; product of Keyence). The mean value was designated as surface roughness Ra. The results are shown in Table 3.

[Preparation of Electro-Conductive Members D2 to D8]

In a manner similar to that used for the preparation of Electro-conductive Member D-1 except for the use of the coating materials shown below in Table 3, Electro-conductive members D2 to D8 were prepared, respectively, and surface roughness Ra of them was measured. The results are shown in Table 3.

<Manufacture of Developing Roller>
[Manufacture of Developing Roller 1]

First, a contact angle of First region forming coating material Z-1 with respect to Electro-conductive member D-1 was measured. By evaluating this contact angle, a percent of exposure and length of line segment LS of Developing roller 1 to be manufactured can be controlled. From 50 to 80 μL of Coating material No. Z-1 was added dropwise to the surface of Electro-conductive member D-1 through a syringe and a contact angle of a droplet of Coating material No. Z-1 on the surface of Electro-conductive member D-1 500 ms after the dropwise addition was measured. The contact angle was measured using a contact angle meter ("DM-501", trade name; product of Kyowa Interface Science) in a measurement environment of a temperature of 23° C., a relative humidity of 50% and an atmospheric pressure. The results are shown in Table 5.

Next, First region forming coating material No. Z-1 was applied onto the surface of Electro-conductive member D-1 by using a dipping method in the following procedure. First, Electro-conductive member D-1 was dipped in Coating material No. Z-1 while holding the upper end portion of the

TABLE 3

| | Electro-conductive member | | | | | | | | |
|---|---|---|---|---|---|---|---|---|---|
| | D-1 | D-2 | D-3 | D-4 | D-5 | D-6 | D-7 | D-8 | D-9 |
| Coating material No. | T-1 | T-2 | T-3 | T-4 | T-5 | T-6 | T-7 | T-8 | T-9 |
| Surface roughness Ra of electro-conductive member (μm) | 1.33 | 1.51 | 1.42 | 1.51 | 1.76 | 1.31 | 1.35 | 1.66 | 1.72 |

<Preparation of First Region Forming Coating Material>
[Preparation of First Region Forming Coating Material No. Z-1]

Next, the first region resin shown in Table 4 was mixed in the amount shown in the same table with 100 parts by mass of methyl ethyl ketone (MEK) to obtain First region forming coating material No. Z-1.

[Preparation of First Region Forming Coating Materials Nos Z-2 to Z-10]

In a manner similar to that used for the preparation of Coating material No. Z-1 except that the kind and amount of the first region resin were changed as shown below in Table 4, First region forming coating materials Nos. Z-2 to Z-10 were prepared.

shaft core with the longer direction of the electro-conductive member as a vertical direction and then, it was pulled up. The coating material was applied in an environment of a temperature of 23° C., relative humidity of 50% and atmospheric pressure and a wind speed therearound was set at 1.6 m/sec. The dipping time was set at 20 seconds and as the pulling-up speed from Coating material No. Z-1, an initial speed and a final speed were set at 30 mm/sec and 20 mm/sec, respectively. The pulling-up speed from the initial speed to the final speed was changed linearly with respect to time. Electro-conductive member Z-1 having a film of Coating material No. Z-1 formed thereon was placed in an oven and heated at a temperature of 120° C. for 80 minutes to dry the film of Coating material No. Z-1. In such a

TABLE 4

| | | Coating material No. | | | | | | | | | |
|---|---|---|---|---|---|---|---|---|---|---|---|
| | | Z-1 | Z-2 | Z-3 | Z-4 | Z-5 | Z-6 | Z-7 | Z-8 | Z-9 | Z-10 |
| Resin for insulating region (Part by mass) | Polystyrene resin ("Polystyrene A-2500", trade name, Mw: 3.12 × 10³; product of TOSOH) | | | | | | | | 15 | | |
| | Polystyrene resin ("Polystyrene F-1", trade name, Mw: 9.49 × 10³; product of TOSOH) | | | | | | | 15 | | | |
| | Polystyrene resin ("Polystyrene F-4", trade name, Mw: 3.72 × 10⁴, product of TOSOH) | 15 | 10 | 7 | | | 20 | | | | |
| | Polystyrene resin ("Polystyrene F-20", trade name, Mw: 1.89 × 10⁵, product of TOSOH) | | | | 7 | | | | | 3 | 25 |
| | Acrylic resin ("Hitaloid HA1473", trade name; product of Hitachi Chemical) | | | | | 7 | | | | | | manner, Developing roller 1 having, on the surface thereof, an electrical insulating first region was obtained.

[Manufacture of Developing Rollers 2 to 9 and 12 to 23]

In a manner similar to that used for Developing roller 1 except that a combination of Electro-conductive member and First region forming coating material was changed as shown in Table 5, contact angle measurement was performed. The results are shown in Table 5. In a manner similar to that used for Developing roller 1 except that a combination of Electro-conductive member, insulating forming coating material, wind speed upon coating and dipping time was changed as shown in Table 5, Developing rollers 2 to 9 and 12 to 23 were manufactured.

Developing roller 14 was manufactured by pulling up the electro-conductive member while changing the initial speed and the final speed to 35 mm/s and 20 mm/s, respectively.

Developing roller 15 was manufactured by pulling up the electro-conductive member while changing the initial speed and the final speed at 35 mm/s and 15 mm/s, respectively.

TABLE 5

| Developing roller No. | Electro-conductive member No. | Dielectric part coating material No. | Contact angle (°) | Wind speed (m/s) | Dipping time (sec) |
|---|---|---|---|---|---|
| Developing roller 1 | D-1 | Z-1 | 31 | 1.6 | 20 |
| Developing roller 2 | D-2 | Z-2 | 37 | 1.6 | 20 |
| Developing roller 3 | D-1 | Z-1 | 31 | 1.6 | 40 |
| Developing roller 4 | D-1 | Z-1 | 31 | 0.5 | 40 |
| Developing roller 5 | D-1 | Z-1 | 31 | 3.3 | 20 |
| Developing roller 6 | D-1 | Z-3 | 31 | 0.1 | 30 |
| Developing roller 7 | D-1 | Z-4 | 29 | 0.2 | 20 |
| Developing roller 8 | D-3 | Z-4 | 41 | 0.2 | 20 |
| Developing roller 9 | D-4 | Z-4 | 42 | 0.2 | 20 |
| Developing roller 12 | D-1 | Z-5 | 38 | 1.6 | 20 |
| Developing roller 13 | D-1 | Z-6 | 41 | 1.6 | 20 |
| Developing roller 14 | D-1 | Z-1 | 31 | 1.6 | 20 |
| Developing roller 15 | D-1 | Z-1 | 31 | 1.6 | 20 |
| Developing roller 16 | D-1 | Z-7 | 25 | 1.6 | 20 |
| Developing roller 17 | D-1 | Z-8 | 20 | 1.6 | 20 |
| Developing roller 18 | D-3 | Z-8 | 21 | 3.3 | 50 |
| Developing roller 19 | D-5 | Z-9 | 50 | 0.0 | 60 |
| Developing roller 20 | D-6 | Z-1 | 8 | 3.3 | 30 |
| Developing roller 21 | D-7 | Z-1 | 15 | 3.3 | 30 |
| Developing roller 22 | D-8 | Z-10 | 32 | 0.0 | 60 |
| Developing roller 23 | D-9 | Z-10 | 37 | 0.0 | 60 |

[Manufacture of Developing Roller 10]

A developing roller having, in the electro-conductive layer thereof, a first region was manufactured in the following procedure by making use of a phase separating phenomenon of the electro-conductive material and the insulating material mixed in the coating liquid.

The materials shown in Table 6 were mixed in the amounts shown in the same table and they were stirred and dispersed for 5 hours in a ball mill to prepare Coating material H-1 for simultaneously forming an electro-conductive layer and a first region.

Next, the shaft core having the electro-conductive silicone rubber layer formed thereon was allowed to stand vertically and rotated at 1500 rpm. Coating material H-1 was applied to it while lowering a spray gun at 30 mm/s. It was applied in an environment of a temperature of 23° C., a relative humidity of 50% and an atmospheric pressure. A distance between the spray gun and the surface of the electro-conductive silicone rubber layer was set at 50 mm. The product thus obtained having the film of Coating material H-1 formed thereon was placed in an oven and heated at a temperature of 80° C. for 15 minutes. Then, it was heated for further 2 hours in the oven having a temperature changed to 140° C. to cure the film and form a 15.0 μm-thick electro-conductive urethane resin layer on the electro-conductive silicone rubber layer. As a result, Developing roller 10 having, in the matrix of the electro-conductive urethane resin layer thereof, an electrical insulating polyester region was obtained.

TABLE 6

| Coating material No. | | H-1 | H-2 |
|---|---|---|---|
| Coating material for simultaneously forming insulating region and electro-conductive layer | Ether polyol ("Adeka Polyether PR-3007", trade name; product of Adeka) | 70 | 80 |
| | Insulating polyester resin ("Vilon 103", trade name; product of Toyobo) | 15 | 10 |
| | Isocyanate ("Millionate MR-400", trade name; product of TOSOH) | 15 | 10 |
| | Carbon black ("Toka Carbon #7360SB", trade name; product of Tokai Carbon) | 15 | 15 |
| | MEK | 300 | 300 |

* The numeral shown in the column of "part by mass" in Table is a solid content mass of each material (part by mass).

[Manufacture of Developing Roller 11]

In a manner similar to that used for Developing roller 10 except that the mixing amounts of the materials used for coating liquid were changed as shown in Table 6, Coating liquid H-2 was prepared. Then, in a manner similar to that used for Developing roller 10 except for the use of Coating liquid H-2, Developing roller 11 was manufactured.

<Evaluation of Developing Roller>

<<Evaluation Item 1: Area of First Region>>

Developing roller 1 fixed so that the horizontal direction of the stage became the longer direction of the developing roller was observed from the surface normal direction at 100× magnification observation with a video microscope ("DIGITAL MICROSCOPE VHX-5000", trade name; product of Keyence) and a zoom lens ("Swing head zoom lens VH-ZST", trade name of the lens used). By using a ring lighting attached to the above zoom lens as an observation light, a difference in brightness between the first region and the second region can be provided in the observation image of the surface of the developing member.

By making use of the difference in brightness, the resulting image is binarized by an image analysis software "Image J ver. 1.45 (developer: Wayne Rasband, National Institutes of Health, NIH). This facilitates determination of an area.

Next, from a length W of a rubber portion in the longer direction of Developing roller 1, 3 points are selected at an interval of 0.1 W in a circumferential direction from the end of the rubber and the following measurement is performed on 27 points in total.

An observation range was set at 1000 μm×1000 μm and was photographed at an observation magnification of 100 times. If the observation range is not large enough, images are combined using an image combiner software (product of Keyence) and then image photographing is performed. Then, the respective areas of the first regions completely falling within the observation range are measured and an arithmetic mean value of them thus obtained is designated as an area of the first region.

When the first region is too large to completely fall within the above-described range of 1000 μm×1000 μm, attention is paid to one of the first regions within the observation range. Photographing is performed while moving the observation range and an area is measured after the whole first region falls within the observation range. The area at the point is designated as the area of the first region.

When the area of the first region becomes 100000 μm$^2$ or more, the area of the first region was expressed as ≥100000 μm$^2$.

<<Evaluation Items 2 to 5: Line Segment LS of Second Region>>

From the binarized image obtained in Evaluation item 1, the length of line segment LS can be calculated using a spreadsheet software such as "Excel" (trade name; product of Microsoft).

First, by using a spreadsheet software, 200 straight lines A were drawn on the binarized image in a circumferential direction of the roller. FIG. 3A shows one example of the binarized image on which straight lines A were drawn. Next, of the straight lines A, the number of the straight lines A passing the second region was counted (Evaluation item 2). Then, as shown in FIG. 3B, the number of all the line segment LS, that is, the straight lines A crossing the second region within the image region and the length of each of the line segment LS were measured.

Figure 4:
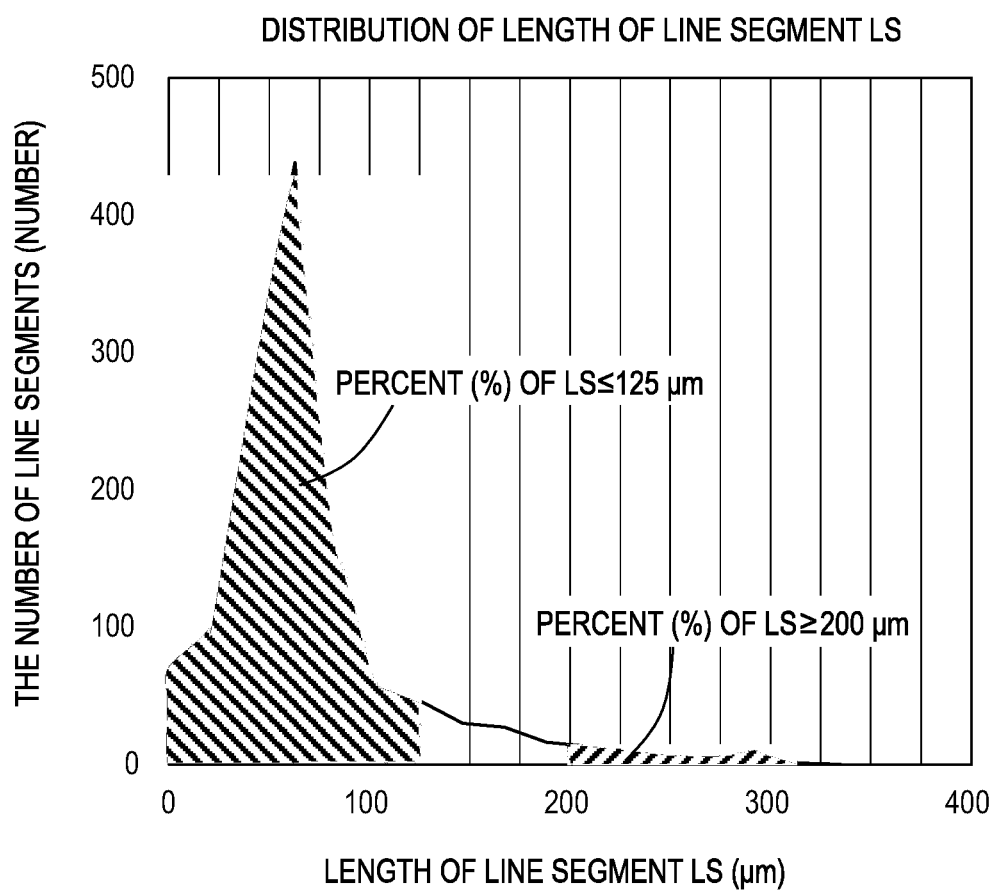
FIG. 4 is a schematic view showing one example of the distribution of the number of line segment LS in the present disclosure.

Then, as shown in FIG. 4, a percent (%) of the number of the line segment LS having a length of 200 μm or more in the total number of the line segment LS within the image region was determined (Evaluation item 3).

Similarly, a percent (%) of the number of the line segment LS having a length of 125 μm or less in the total number of the line segment LS was determined (Evaluation item 4). In the end, an arithmetic mean length (μm) of all the line segment LS within the image region was determined (Evaluation item 5).

In any of Evaluation items, 27 images obtained in Evaluation item 1 were treated and an arithmetic mean value of them was used as a measurement result of each developing roller.

<<Evaluation Item 6: Average Percent of Exposure>>

An average percent of exposure (percent (%) of the sum of the areas of the second region in the observed region) was determined by the following method. The observation image obtained in the above-described measurement was used. Supposing that the sum of the areas of the second region present in the observation range was S', the percentage of S' in the area of the whole observation range was designated as a percent of exposure of the second region in the observation image. The 27 observation images were similarly measured and an arithmetic mean value of the values thus obtained was designated as an average percent (%) of exposure.

<<Evaluation Item 7: Thickness of First Region>>

The thickness of the first region was determined.

Described specifically, a razor blade was inserted into Developing roller 1 so that it became perpendicular to the surface thereof and the cross-section of the roller was cut out. The resulting cross-section was observed using a scanning electron microscope ("JSM-7800 FPRIME", trade name of a Schottky field emission scanning electron microscope; product of JEOL). The maximum thickness of the first region in the surface normal line direction of the developing roller was expressed as L'. The measurement was performed, from the end portion of the longer direction W of the surface of the developing roller, at an interval of 0.1 W, totally 9 points, and an arithmetic mean value of them was designated as Thickness L (μm) of the first region in each of the developing rollers.

<<Evaluation Items 8 and 9: Respective Surface Potentials of First Region and Second Region of Developing Roller>>

Respective surface potentials of the first region and the second region were measured using SKPM (surface potential microscope). In the microscope, the material of the surface of the roller having high resistance is easily charged so that a negative surface potential is observed in this case. When the material has low resistance, on the contrary, the surface thereof is hard to be charged so that the value of the surface potential becomes small or a positive surface potential is observed. Under the following conditions, 10 points in the first region and 10 points in the second region, each of the developing roller, were measured and arithmetic mean values of them were designated as "surface potential (V) of the first region" (Evaluation item 8) and "surface potential V of the second region" (Evaluation item 9), respectively.

SKPM (surface potential microscope)
Scan Size: 50 μm
Scan Rate: 0.2 Hz
Free amplitude: 400 mV
Set point: 295 mV
Sample voltage: +4.5 V
Nap Drive amplitude: 2 V
Delta height: 90 nm <<Evaluation Item 10: Uniformity in Longer Direction of Developing Roller>>

From the 27 observation images obtained in Evaluation item 1, images obtained at three positions in the circumferential direction for nine positions in the longer direction were selected. With regard to the image at the three positions, an arithmetic mean percent (%) of the number of the line segment LS having a length of 200 μm or more in the total number of the line segment LS within the image region obtained in Evaluation item 3 was determined. Based on the values, calculation was performed for the 9 positions in the longer direction and a percent (%) of the number of line segment LS at each of the longer-direction positions was determined.

From the maximum value and the minimum value of the percent (%) of the number of the line segment LS at 9 longer-direction positions, a (minimum value)/(maximum value) was determined and used as an indicator showing the uniformity in longer direction.

[Measurement of Developing Rollers 1 to 23]

Developing rollers 1 to 23 were evaluated for Evaluation items 1 to 10 (area of first region, line segment LS of exposed portion, average percent of exposure, thickness of first region, surface potential of the first region and the second region). The results are shown in Tables 7 and 8. In addition, the residual potential time constant of the first region and the second region of each of the developing rollers was measured and it was confirmed that the time constant of the first region was 60.0 seconds or more and that of the second region was less than 6.0 seconds. The results are shown in Table 9.

TABLE 7

| Example No. | Developing roller | Evaluation item 1 Area of first region (μm$^2$) | Evaluation item 2 Of 200 straight lines, the number passing second region (number) | Evaluation item 3 Percent of line segment LS 200 μm long or more (%) | Evaluation item 4 Percent of line segment LS 125 μm long or less (%) | Evaluation item 5 Average of line segment LS (μm) |
|---|---|---|---|---|---|---|
| Example 1 | Developing roller 1 | ≥100000 | >10 | 4.0 | 87.6 | 78.2 |

TABLE 7-continued

| | | | | | | |
|---|---|---|---|---|---|---|
| Example 2 | Developing roller 2 | ≥100000 | >10 | 3.3 | 86.3 | 87.7 |
| Example 3 | Developing roller 3 | ≥100000 | >10 | 4.4 | 85.6 | 85.4 |
| Example 4 | Developing roller 4 | ≥100000 | >10 | 2.8 | 84.7 | 84.3 |
| Example 5 | Developing roller 5 | ≥100000 | >10 | 2.9 | 84.5 | 82.9 |
| Example 6 | Developing roller 6 | ≥100000 | >10 | 3.5 | 87.9 | 75.4 |
| Example 7 | Developing roller 7 | ≥100000 | >10 | 3.4 | 78.7 | 66.7 |
| Example 8 | Developing roller 8 | ≥100000 | >10 | 3.2 | 76.4 | 56.2 |
| Example 9 | Developing roller 9 | ≥100000 | >10 | 4.3 | 73.6 | 116.5 |
| Example 10 | Developing roller 10 | ≥100000 | >10 | 3.9 | 87.7 | 113.9 |
| Example 11 | Developing roller 11 | ≥100000 | >10 | 4.0 | 86.9 | 94.8 |
| Example 12 | Developing roller 12 | ≥100000 | >10 | 3.1 | 82.0 | 65.0 |
| Example 13 | Developing roller 13 | ≥100000 | >10 | 2.4 | 89.4 | 47.9 |
| Example 14 | Developing roller 14 | ≥100000 | >10 | 2.2 | 83.9 | 58.1 |
| Example 15 | Developing roller 15 | ≥100000 | >10 | 3.0 | 85.4 | 95.0 |
| Example 16 | Developing roller 16 | 91200 | >10 | 4.2 | 82.3 | 87.6 |
| Example 17 | Developing roller 17 | 63700 | >10 | 4.9 | 81.0 | 92.3 |

| Example No. | Evaluation item 6 Average percent of exposure (%) | Evaluation item 7 Height of dielectric part (μm) | Evaluation item 8 Potential of first region (V) | Evaluation item 9 Potential of second region (V) | Evaluation item 10 Uniformity in longer direction |
|---|---|---|---|---|---|
| Example 1 | 62.8 | 2.50 | −0.62 | 0.37 | 0.95 |
| Example 2 | 65.4 | 0.79 | −0.69 | 0.06 | 0.92 |
| Example 3 | 60.3 | 0.45 | −0.52 | 0.22 | 0.90 |
| Example 4 | 55.7 | 0.40 | −0.50 | 0.49 | 0.92 |
| Example 5 | 32.4 | 2.98 | −0.67 | 0.11 | 0.93 |
| Example 6 | 77.9 | 0.86 | −0.53 | 0.45 | 0.94 |
| Example 7 | 49.1 | 2.53 | −0.61 | 0.14 | 0.95 |
| Example 8 | 56.6 | 0.06 | −0.52 | 0.23 | 0.96 |
| Example 9 | 68.2 | 2.47 | −0.68 | 0.45 | 0.91 |
| Example 10 | 44.6 | 0.00 | −0.59 | 0.13 | 0.92 |
| Example 11 | 69.3 | 0.00 | −0.65 | 0.24 | 0.91 |
| Example 12 | 41.2 | 2.58 | −0.45 | 0.37 | 0.92 |
| Example 13 | 59.3 | 3.50 | −0.71 | 0.13 | 0.90 |
| Example 14 | 49.9 | 1.48 | −0.76 | 0.41 | 0.85 |
| Example 15 | 47.4 | 0.56 | −0.42 | 0.43 | 0.81 |
| Example 16 | 42.3 | 2.33 | −0.55 | 0.35 | 0.97 |
| Example 17 | 35.2 | 0.96 | −0.67 | 0.65 | 0.95 |

TABLE 8

| Example No. | Developing roller | Evaluation item 1 Area of first region (μm²) | Evaluation item 2 Of 200 straight lines, the number passing second region (number) | Evaluation item 3 Percent of line segment LS 200 μm long or more (%) | Evaluation item 4 Percent of line segment LS 125 μm long or less (%) | Evaluation item 5 Average of line segment LS (μm) |
|---|---|---|---|---|---|---|
| Comp. Ex. 1 | Developing roller 18 | ≥100000 | >10 | 4.3 | 81.1 | 73.0 |
| Comp. Ex. 2 | Developing roller 19 | ≥100000 | >10 | 5.0 | 81.9 | 96.4 |
| Comp. Ex. 3 | Developing roller 20 | ≥100000 | 0 | — | — | — |
| Comp. Ex. 4 | Developing roller 21 | ≥100000 | 2 | 0.1 | 100.0 | 20.4 |

TABLE 8-continued

| | | | | | | |
|---|---|---|---|---|---|---|
| Comp. Ex. 5 | Developing roller 22 | ≥100000 | >10 | 5.1 | 77.9 | 81.3 |
| Comp. Ex. 6 | Developing roller 23 | ≥100000 | >10 | 10.5 | 56.0 | 113.0 |

| Example No. | Evaluation item 6 Average percent of exposure (%) | Evaluation item 7 Height of dielectric part (μm) | Evaluation item 8 Potential of first region (V) | Evaluation item 9 Potential of second region (V) | Evaluation item 10 Uniformity in longer direction |
|---|---|---|---|---|---|
| Comp. Ex. 1 | 28.8 | 1.1 | −0.58 | 0.14 | 0.95 |
| Comp. Ex. 2 | 80.6 | 0.4 | −0.68 | 0.45 | 0.93 |
| Comp. Ex. 3 | 0.0 | — | −0.57 | — | 0.92 |
| Comp. Ex. 4 | 1.2 | 2.6 | −0.65 | 0.32 | 0.92 |
| Comp. Ex. 5 | 60.2 | 2.8 | −0.56 | 0.13 | 0.95 |
| Comp. Ex. 6 | 74.0 | 1.3 | −0.59 | 0.19 | 0.92 |

<Evaluation of Image>
<<Evaluation Item 11: Electric Charge of Toner on Developing Roller in Environment of 33° C. and Relative Humidity of 80%>>

For torque reduction, from a process cartridge for magenta for an electrophotographic image forming apparatus ("Color LaserJet Pro M452dw", trade name; product of Hewlett Packard), a toner supply roller and a cleaning blade were removed. The removal reduces the torque, while it reduces an amount of a toner supplied to a developing roller and further, a transfer residue of the toner remains on a photoreceptor. Further, a high-voltage power supply was connected to a charge roller and the developing roller so that a potential VD of the background part of the photoreceptor became −800 V and a voltage VDC applied to the developing roller became −300 V (meaning that a difference Vback between the potential VD of the photoreceptor and the development bias VDC became 500 V).

Next, as a developing roller of the process cartridge, Developing roller 1 was loaded and it was left to stand for 24 hours in an environment of a temperature of 33° C. and a relative humidity of 80% (which may also be called "H/H environment" hereinafter). After a solid black image was output onto 20 A4 sheets continuously at a rate of 28 sheets/min in the same environment, a solid white image was output onto a new copy sheet. During output of the solid white image, the printer was stopped. Next, the process cartridge was taken out and a toner carried on a narrower portion, of portions of the developing roller sandwiched between the developer regulating blade and a contact position with the photoreceptor, was sucked and collected by a metal cylindrical tube and a cylindrical filter. At that time, an electric charge accumulated in a condenser through the metal cylindrical tube was measured by an electric charge meter ("8252", trade name; product of ADC) and the mass of the sucked developing agent was measured. Based on the resulting values, an electric charge (μC/g) per unit mass was calculated.

<<Evaluation Item 12: Conveyance Amount of Toner by Developing Roller in H/H Environment>>

After a solid black image was output continuously onto 10 A4 sheets at a speed of 28 sheets/min in the same environment, output operation was terminated during outputting the black sold image onto a sheet. Developing roller 1 was taken out and an amount of a toner (conveyance amount of a toner) attached onto Developing roller 1 was measured. A region thus measured was between the contact portion with the electrophotographic photoreceptor and the contact portion with the toner regulating member at the time when the output operation was terminated. The toner was sucked by a sucking nozzle having an opening with a diameter of 5 mm and a mass of the toner sucked and an area of a region where sucking was performed were measured to determine a conveyance amount of a toner (mg/cm$^2$).

<<Evaluation Item 13: Charging of Developing Roller in H/H Environment>>

After a black sold image was output continuously onto 10 A4 sheets at a speed of 28 sheets/min in an H/H environment as in Evaluation Item 12, Developing roller 1 was taken out and the toner on Developing roller 1 was blown off and removed by air. Then, the surface potential of Developing roller 1 was measured. A region thus measured was between the electrophotographic photoreceptor and the developer amount regulating member at the time when the output operation was terminated. Measurement was performed by grounding the shaft core of Developing roller 1 and determining the surface potential (V) of Developing roller 1 by connecting a surface potential probe ("MODEL 6000B-8", trade name) to a surface potential meter ("MODEL 344", trade name; product of Trek) and measuring a potential at 6 mm distant from the surface of the developing roller. Time until the measurement was 30 seconds after the final image was output.

<<Evaluation Item 14: Fog on Photoreceptor in H/H Environment>>

First, a laser printer loaded with Developing roller 1 to be evaluated was placed in an H/H environment and then allowed to stand for 6 hours or more. Next, a solid white image was output onto an A4 sheet and during the output of the solid white image, the printer was stopped. A developer attached onto the photoreceptor at that time was stripped off with a tape ("CT18", trade name; product of NICHIBAN) and a reflectance was measured by a reflection densitometer ("TC-6DS/A", trade name; product of Tokyo Denshoku). A reduction amount (%) of reflectance based on the reflectance of the tape was measured and it was designated as fog on photoreceptor (Dr).

<<Evaluation Item 15: Image Fog in H/H Environment>>

After the evaluation of fog on the photoreceptor, a solid white image was output onto a new copy sheet. At the time of output, a portion of the A4 sheet was covered with a sticky paper slip ("Post-It®", trade name, product of 3M). Similar to Evaluation item 14, the reflectance of the white solid image portion was measured. A reduction amount (%) in reflectance based on the reflectance of the background portion covered with the sticky paper slip was measured and it was designated as a value of fog and evaluated according to the following criteria.

Rank A: less than 0.5
Rank B: 0.5 or more to less than 1.0
Rank C: 1.0 or more to less than 3.0
Rank D: 3.0 or more <<Evaluation Item 16: Difference in Image Density in H/H Environment>>

Next, a solid black image was output onto a sheet of paper at a speed of 28 A4 sheets/min. The image density of the resulting solid black image was measured using a spectral densitometer ("508", trade name; product of Xrite). A difference in density between a front end and a rear end of the image was found and evaluated according to the following criteria.

Rank A: less than 0.05.
Rank B: 0.05 or more to less than 0.10
Rank C: 0.10 or more to less than 0.20
Rank D: 0.20 or more <<Evaluation Item 17: Surface Potential of Developing Roller at Temperature of 15° C. and Relative Humidity of 10%>>

An electrophotographic image forming apparatus ("Color Laser Jet Pro M452dw", trade name; product of Hewlett Packard) and a process cartridge for magenta from which a toner supply roller had been removed were left to stand for 24 hours in an environment of a temperature of 15° C. and a relative humidity of 10% (which environment may also be called "L/L environment" hereinafter). After a solid white image was output continuously onto 50 sheets at a rate of 28 A4 sheets/min in the same atmosphere, an output operation was terminated during outputting the solid white image onto one sheet and Developing roller 1 was removed. After the toner was brown off and removed by air, the surface potential of Developing roller 1 was measured. A region thus measured was between the electrophotographic photoreceptor and the developer amount regulating member at the time when the output operation was terminated. The surface potential was measured by grounding the shaft core of Developing roller 1 and determining the surface potential of Developing roller 1 by connecting a surface potential probe ("MODEL 6000B-8", trade name) to a surface potential meter ("MODEL 344", trade name; product of Trek) and measuring a potential at 6 mm distant from the surface of the developing roller. Time until the measurement was 30 seconds after the final image was output.

<<Evaluation Item 18: Image Density Stability of Developing Roller at Temperature of 15° C. and a Relative Humidity of 10%>>

Next, a 25% halftone image of solid black was output onto one sheet, a solid white image was output to 48 sheets and a 25% halftone image of solid black was output onto one sheet continuously at a speed of 28 A4 sheets/min. The density of the first and 50th halftone images thus obtained was measured using a spectral densitometer ("508", trade name; product of Xrite) and a density difference between the first and 50th sheets was found. Image density stability was evaluated from the resulting density difference according to the following criteria.

Rank A: less than 0.05.
Rank B: 0.05 or more to less than 0.10.
Rank C: 0.10 or more to less than 0.20.
Rank D: more than 0.20

Results of Evaluation items 11 to 18 are shown in Table 10.

TABLE 9

|  | Volume resistivity of first region ($\Omega \cdot cm$) | Time constant of first region (sec) | Volume resistivity of second region ($\Omega \cdot cm$) | Time constant of second region (sec) |
|---|---|---|---|---|
| Developing roller 1 | 1.7E+14 | 1012.5 | 1.6E+08 | Unmeasurable |
| Developing roller 2 | 7.9E+14 | 4766.0 | 2.0E+09 | Unmeasurable |
| Developing roller 3 | 1.6E+13 | 98.9 | 1.3E+09 | Unmeasurable |
| Developing roller 4 | 1.1E+13 | 64.1 | 3.2E+07 | Unmeasurable |
| Developing roller 5 | 4.7E+14 | 2823.3 | 1.8E+07 | Unmeasurable |
| Developing roller 6 | 2.2E+13 | 130.3 | 1.3E+09 | Unmeasurable |
| Developing roller 7 | 1.3E+14 | 755.4 | 1.8E+08 | Unmeasurable |
| Developing roller 8 | 1.6E+13 | 95.1 | 3.8E+06 | Unmeasurable |
| Developing roller 9 | 6.3E+14 | 3785.7 | 3.8E+07 | Unmeasurable |
| Developing roller 10 | 7.9E+13 | 476.6 | 8.9E+07 | Unmeasurable |
| Developing roller 11 | 2.9E+14 | 1749.9 | 1.3E+08 | Unmeasurable |
| Developing roller 12 | 3.2E+12 | 19.0 | 6.6E+11 | 9.2 |
| Developing roller 13 | 1.3E+15 | 7553.6 | 3.2E+07 | Unmeasurable |
| Developing roller 14 | 4.0E+15 | 23886.4 | 1.6E+09 | Unmeasurable |
| Developing roller 15 | 6.3E+13 | 312.8 | 6.3E+08 | Unmeasurable |
| Developing roller 16 | 3.2E+13 | 189.7 | 7.9E+07 | Unmeasurable |
| Developing roller 17 | 5.0E+14 | 3007.1 | 2.5E+08 | Unmeasurable |
| Developing roller 18 | 7.1E+13 | 423.8 | 6.3E+08 | Unmeasurable |
| Developing roller 19 | 6.0E+14 | 3600.4 | 3.0E+08 | Unmeasurable |
| Developing roller 20 | 4.5E+13 | 269.5 | — | — |
| Developing roller 21 | 3.1E+14 | 1853.8 | 1.6E+07 | Unmeasurable |
| Developing roller 22 | 3.7E+13 | 224.6 | 1.6E+08 | Unmeasurable |
| Developing roller 23 | 7.5E+13 | 451.7 | 5.6E+08 | Unmeasurable |

TABLE 10

|  | Developing roller No. | Evaluation item 11 H/H Q/M ($\mu$C/mg) | Evaluation item 12 H/H M/S (mg/cm$^2$) | Evaluation item 13 H/H Surface potential (V) | Evaluation item 14 H/H Fog on Dr (%) | Evaluation item 15 H/H Evaluation of image fog | Evaluation item 16 H/H Image density difference | Evaluation item 17 L/L Surface potential (V) | Evaluation item 18 L/L Image evaluation |
|---|---|---|---|---|---|---|---|---|---|
| Example 1 | Developing roller 1 | −4.9 | 0.50 | −5.8 | 1.2 | A | A | −7.9 | A |
| Example 2 | Developing roller 2 | −6.7 | 0.42 | −5.2 | 1 | A | A | −7.8 | A |
| Example 3 | Developing roller 3 | −5.7 | 0.43 | −6.8 | 1.1 | A | A | −7.8 | A |

TABLE 10-continued

| | Developing roller No. | Evaluation item 11 H/H Q/M (μC/mg) | Evaluation item 12 H/H M/S (mg/cm²) | Evaluation item 13 H/H Surface potential (V) | Evaluation item 14 H/H Fog on Dr (%) | Evaluation item 15 H/H Evaluation of image fog | Evaluation item 16 H/H Image density difference | Evaluation item 17 L/L Surface potential (V) | Evaluation item 18 L/L Image evaluation |
|---|---|---|---|---|---|---|---|---|---|
| Example 4 | Developing roller 4 | −5.7 | 0.48 | −6.5 | 1 | A | A | −7.7 | A |
| Example 5 | Developing roller 5 | −5.0 | 0.41 | −5.3 | 1.4 | A | A | −7.5 | A |
| Example 6 | Developing roller 6 | −5.5 | 0.45 | −5.5 | 1.3 | A | A | −7.5 | A |
| Example 7 | Developing roller 7 | −3.0 | 0.46 | −6.1 | 3.2 | B | A | −7.5 | A |
| Example 8 | Developing roller 8 | −2.8 | 0.41 | −7.2 | 3.3 | B | A | −7.9 | A |
| Example 9 | Developing roller 9 | −2.6 | 0.42 | −6.1 | 3.4 | B | A | −7.5 | A |
| Example 10 | Developing roller 10 | −2.8 | 0.43 | −6.2 | 3.5 | B | A | −7.7 | A |
| Example 11 | Developing roller 11 | −2.5 | 0.42 | −5.0 | 3.1 | B | A | −7.9 | A |
| Example 12 | Developing roller 12 | −4.5 | 0.35 | −4.6 | 1.3 | A | B | −7.8 | A |
| Example 13 | Developing roller 13 | −5.9 | 0.44 | −5.7 | 1.1 | A | A | −11.2 | B |
| Example 14 | Developing roller 14 | −3.0 | 0.44 | −5.7 | 3.1 | B | A | −7.8 | A |
| Example 15 | Developing roller 15 | −2.4 | 0.42 | −5.4 | 3.5 | B | A | −7.7 | A |
| Example 16 | Developing roller 16 | −2.5 | 0.46 | −4.7 | 3 | B | A | −7.6 | A |
| Example 17 | Developing roller 17 | −2.1 | 0.45 | −4.8 | 3.6 | B | A | −7.7 | A |
| Comp. Ex. 1 | Developing roller 18 | −1.9 | 0.23 | −2.3 | 5.1 | C | C | −35.1 | D |
| Comp. Ex. 2 | Developing roller 19 | −1.7 | 0.17 | −0.7 | 6 | C | D | −22.3 | C |
| Comp. Ex. 3 | Developing roller 20 | −1.5 | 0.18 | −0.6 | 6.2 | C | D | −48.6 | D |
| Comp. Ex. 4 | Developing roller 21 | −0.7 | 0.15 | −0.9 | 18.5 | D | D | −42.3 | D |
| Comp. Ex. 5 | Developing roller 22 | −1.2 | 0.24 | −1.7 | 10.1 | D | C | −7.6 | C |
| Comp. Ex. 6 | Developing roller 23 | −0.8 | 0.22 | −2.6 | 15.5 | D | C | −7.6 | C |

In Examples 1 to 17, the following points were confirmed.

(1) A developing roller has, on the outer surface thereof, a second region and a first region and an average percent of exposure falls within a range of from 30 to 80%.

(2) When a square observation region 1000 μm on each side is placed on the outer surface of the developing roller and 200 straight lines are drawn in the observation region at an interval of 5 μm in a circumferential direction of the developing roller, two or more of the 200 straight lines pass the second region at least once.

(3) The number of line segment LS having a length of 200 μm or more in the total number of line segment LS is 5% or less.

Comparison between Examples 1 to 17 and Comparative Examples 1 to 6 has revealed that the developing roller falling within the scope of the present disclosure does not cause a reduction in electric charge of a toner, causes less fog, and provides an image having a high image quality even in a high-temperature high-humidity environment or high Vback region.

In Examples 1 to 6, compared with Examples 7 to 9, the number of line segment LS having a length of 125 μm or less is 80% or more so that a charge amount of a toner is further high and fog on Dr and image fog are suppressed further.

In Examples 10 and 11, the electro-conductive layer has an insulating part (first region), while in Examples 1 to 6, the first region protrudes against the second region so that a charge amount of a toner is further high and fog on Dr and image fog are suppressed.

In Examples 1 to 6, compared with Examples 12 and 13, the first region has a surface potential falling within a range of from −0.7 V to −0.5 V. In both the H/H environment and L/L environment, therefore, the developing rollers are charged appropriately, convey an appropriate amount of a toner, and can provide an image having a high image quality.

As shown in Table 7, in Examples 1 to 6, compared with Examples 14 and 15, uniformity in longitudinal direction is 0.90 or more, showing that variation is reduced to small. Therefore, a charge amount of a toner is high and fog is suppressed.

As shown in Table 7, in Examples 1 to 6 compared with Examples 16 and 17, the first region has an area of 100000 μm² or more so that fog is suppressed further.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-144377, filed Jul. 31, 2018, which is hereby incorporated by reference herein in its entirety.

What is claimed is:

1. An electrophotographic member, comprising:
an electro-conductive substrate;
an electro-conductive layer on the substrate; and
a plurality of insulating parts, a surface of the electrophotographic member having an electrical insulating first region and an adjacent electro-conductive second region, wherein
when a square region 1000 μm on a side is put on an outer surface of the electrophotographic member oriented with one side of the square region parallel to a longer direction of the electrophotographic member, a total area of the second region in the square region is 30 to 80% of an area of the square region,
when 200 straight lines are drawn in the square region at an interval of 5 μm in a circumferential direction of the electrophotographic member, at least two straight lines pass the second region at least once, and
when in each of the straight lines passing the second region at least once a portion overlapping with the second region is defined as a line segment LS, the number of line segments LS having a length of at least 200 μm is at most 5% of the total number of line segments LS.

2. The electrophotographic member according to claim 1, wherein the number of line segments LS having a length of from more than 0 to 125 μm is at least 80% of the total number of line segments LS.

3. The electrophotographic member according to claim 1, wherein an arithmetic mean value of an area of the first region is 100000 µm² or more.

4. The electrophotographic member according to claim 1, wherein the first region comprises a protrusion on the electrophotographic member surface.

5. The electrophotographic member according to claim 1, wherein $-0.70 \leq V1 \leq -0.50$ V and $0.00 \leq V2 \leq 0.50$ V where V1 and V2 are respectively surface potentials of the first and second regions measured in an environment of a temperature of 23° C. and a relative humidity of 50% using a scanning probe microscope.

6. The electrophotographic member according to claim 1, wherein the square region has uniformity of 0.90 or more in the longer direction of the electrophotographic member.

7. The electrophotographic member according to claim 1, wherein a time required for damping a surface potential to V0×(1/e) is at least 60.0 seconds when the electrophotographic member is charged so that a surface potential of the first region becomes V0 (V).

8. The electrophotographic member according to claim 1, wherein a time required for damping a surface potential to V0×(1/e) is less than 6.0 seconds when the electrophotographic member is charged so that a surface potential of the second region becomes V0 (V).

9. An electrophotographic process cartridge detachably mounted on an electrophotographic image forming apparatus, comprising a developing roller configured to supply a toner, the developing roller having an electro-conductive substrate, an electro-conductive layer on the substrate and a plurality of insulating parts, and an outer surface of the developing roller having an electrical insulating first region and an electro-conductive second region, wherein when a square region 1000 µm on a side is put on an outer surface of the electrophotographic member oriented with one side of the square region parallel to a longer direction of the electrophotographic member a total area of the second region in the square region is 30 to 80% of an area of the square region, when 200 straight lines are drawn in the square region at an interval of 5 µm in a circumferential direction of the electrophotographic member, at least two straight lines pass the second region at least once, and when in each of the straight lines passing the second region at least once a portion overlapping with the second region is defined as a line segment LS, the number of line segments LS having a length of at least 200 µm is at most 5% of the total number of line segments LS.

10. An electrophotographic image forming apparatus comprising an electrophotographic photoreceptor, a charging unit placed chargeable to the electrophotographic photoreceptor, and a developing roller for supplying a toner to the electrophotographic photoreceptor, the developing roller having an electro-conductive substrate, an electro-conductive layer on the substrate and a plurality of insulating parts, and an outer surface of the developing roller having an electrical insulating first region and an electro-conductive second region, wherein when a square region 1000 µm on a side is put on an outer surface of the electrophotographic member oriented with one side of the square region parallel to a longer direction of the electrophotographic member a total area of the second region in the square region is 30 to 80% of an area of the square region, when 200 straight lines are drawn in the square region at an interval of 5 µm in a circumferential direction of the electrophotographic member, at least two straight lines pass the second region at least once, and when in each of the straight lines passing the second region at least once a portion overlapping with the second region is defined as a line segment LS, the number of line segments LS having a length of at least 200 µm is at most 5% of the total number of line segments LS.

* * * * *